(12) United States Patent
Yanoto

(10) Patent No.: US 11,060,475 B2
(45) Date of Patent: Jul. 13, 2021

(54) VALVE BODY OPERATION ESTIMATION DEVICE

(71) Applicant: DENSO CORPORATION, Kariya (JP)

(72) Inventor: Keisuke Yanoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 16/293,734

(22) Filed: Mar. 6, 2019

(65) Prior Publication Data

US 2019/0203687 A1    Jul. 4, 2019

Related U.S. Application Data

(63) Continuation of application No. PCT/JP2017/028667, filed on Aug. 8, 2017.

(30) Foreign Application Priority Data

Sep. 13, 2016  (JP) .............................. JP2016-178770

(51) Int. Cl.
  *B05B 12/00* (2018.01)
  *F02D 41/24* (2006.01)
  (Continued)

(52) U.S. Cl.
  CPC ........ *F02D 41/2467* (2013.01); *B05B 12/004* (2013.01); *B05B 12/02* (2013.01); *F02D 41/20* (2013.01); *F02D 41/34* (2013.01); *F02D 41/40* (2013.01); *F02D 41/401* (2013.01); *F02M 51/061* (2013.01); *F02M 51/0685* (2013.01); *F02M 65/005* (2013.01); *F02D 41/3818* (2013.01); *F02D 2041/2055* (2013.01);
  (Continued)

(58) Field of Classification Search
  CPC ...... F02D 41/2467; F02D 41/40; F02D 41/34; F02D 41/20; F02D 41/401; F02D 41/3818; F02D 2041/389; F02D 2041/2055; F02D 2200/0602; F02D 2200/063; F02D 2200/0618; B05B 12/004; B05B 12/02; F02M 51/0685; F02M 51/061; F02M 65/005; Y02T 10/40
  See application file for complete search history.

(56) References Cited

U.S. PATENT DOCUMENTS 6,390,063 B1 * 5/2002 Obata ..................... F02D 43/00
                                                                  123/399
6,772,720 B2 * 8/2004 Majima ............... F02D 13/0253
                                                                  123/90.15
(Continued)

*Primary Examiner* — Qingzhang Zhou
(74) *Attorney, Agent, or Firm* — Nixon & Vanderhye P.C.

(57) ABSTRACT

An ECU as a valve body operation estimation device includes a sampling unit that obtains at least one of voltage and current of the electromagnetic coil as sample values at intervals of a predetermined time in a sampling period set based on a predetermined reference timing, a variation calculation unit that calculates a degree of variation of the sample values obtained in the sampling period, a variation waveform which represents a change of the degree of variation caused by shifting the reference timing including a point at which the degree of variation reduces and then rises as the reference timing is delayed, the point referred to as a rising start point, and a timing estimation unit that estimates an operation timing of a valve body based on the reference timing at the rising start point.

4 Claims, 12 Drawing Sheets

(51) Int. Cl.
*F02D 41/40* (2006.01)
*F02M 51/06* (2006.01)
*F02D 41/34* (2006.01)
*F02D 41/20* (2006.01)
*B05B 12/02* (2006.01)
*F02M 65/00* (2006.01)
*F02D 41/38* (2006.01)

(52) U.S. Cl.
CPC .................. *F02D 2041/389* (2013.01); *F02D 2200/0602* (2013.01); *F02D 2200/063* (2013.01); *F02D 2200/0618* (2013.01)

(56) References Cited

U.S. PATENT DOCUMENTS

| | | | |
|---|---|---|---|
| 7,316,220 B2* | 1/2008 | Kikutani | F02D 41/20 123/467 |
| 8,469,007 B2* | 6/2013 | Tokuo | F02D 41/3845 123/501 |
| 2016/0131074 A1* | 5/2016 | Nakano | F02D 41/20 137/2 |
| 2016/0237937 A1* | 8/2016 | Kusakabe | F02D 41/402 |
| 2016/0245211 A1 | 8/2016 | Katsurahara et al. | |

* cited by examiner

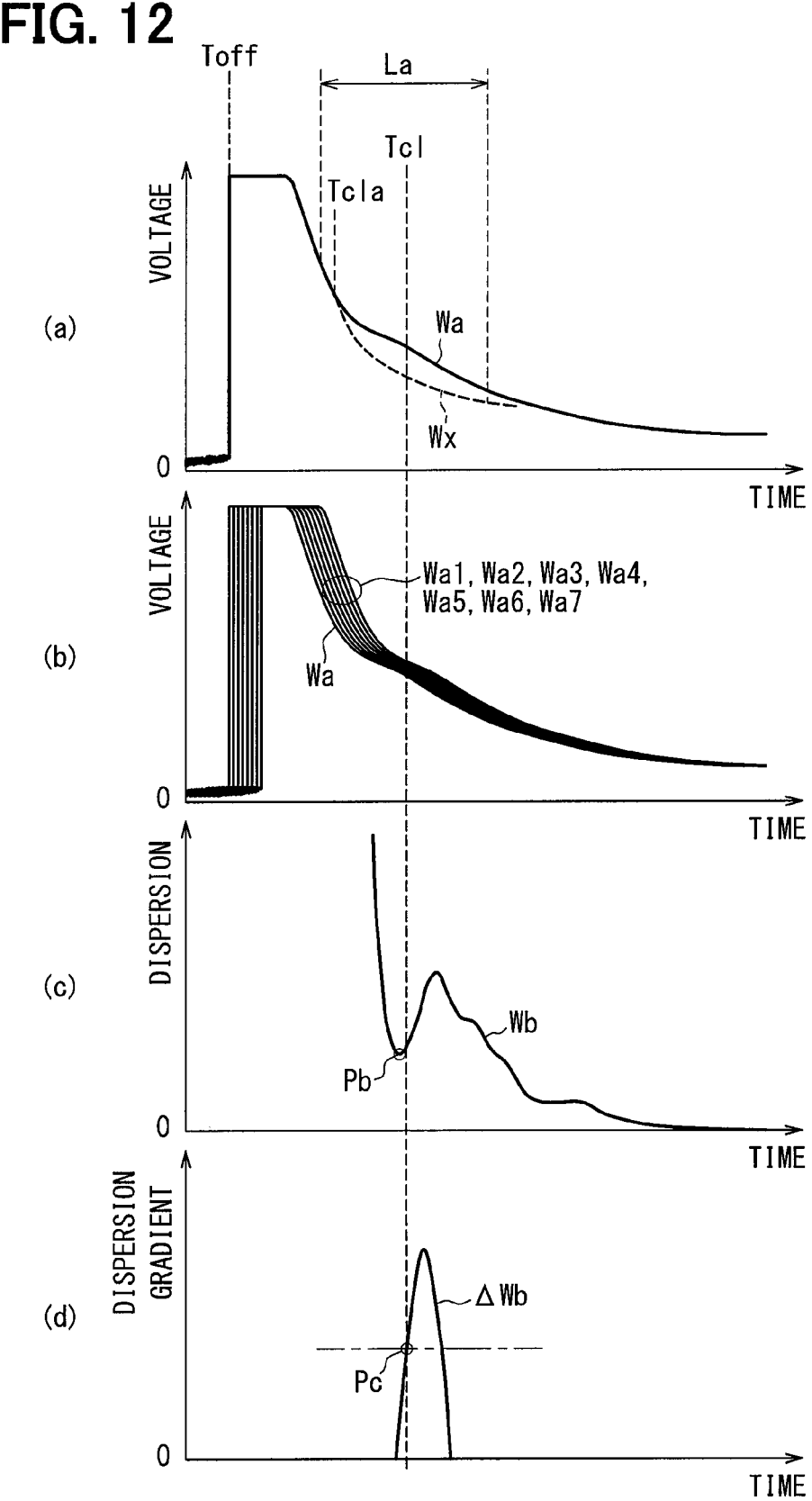

VALVE BODY OPERATION ESTIMATION DEVICE

CROSS REFERENCE TO RELATED APPLICATIONS

The present application is a continuation application of International Patent Application No. PCT/JP2017/028667 filed on Aug. 8, 2017, which designated the U.S. and claims the benefit of priority from Japanese Patent Application No. 2016-178770 filed on Sep. 13, 2016. The entire disclosures of all of the above applications are incorporated herein by reference.

TECHNICAL FIELD

The present disclosure relates to a valve body operation estimation device for estimating operation timings of a valve body for opening and closing an injection hole of a fuel injection valve.

BACKGROUND

A general fuel injection valve includes a body providing an injection hole for injecting a fuel, a valve body that is unseated from and seated on a seating surface of the body for opening and closing the injection hole, and an electromagnetic coil for generating an electromagnetic attraction force as a valve opening force of the valve body.

SUMMARY

A valve body operation estimation device is applied to a fuel injection valve including a body having an injection hole through which fuel is injected, a valve body that is separated from or seated on a seating surface of the body to open or close the injection hole, and an electromagnetic coil that generates electromagnetic attraction force as valve opening force of the valve body. The valve body operation estimation device is configured to estimate at least one of a valve-closing start timing that the valve body starts valve closing operation upon start of de-energization of the electromagnetic coil, a valve-closing completion timing that the valve closing operation is completed, a valve-opening start timing that the valve body starts valve opening operation upon start of energization of the electromagnetic coil, and a valve-opening completion timing that the valve opening operation is completed. The valve body operation estimation device includes a sampling unit that is configured to obtain at least one of voltage and current of the electromagnetic coil as a plurality of sample values at intervals of a predetermined time in a sampling period set based on a predetermined reference timing, a variation calculation unit that is configured to calculate a degree of variation of the plurality of sample values obtained in the sampling period, a variation waveform which represents a change of the degree of variation caused by shifting the reference timing including a point at which the degree of variation reduces and then rises as the reference timing is delayed, the point referred to as a rising start point, and a timing estimation unit that is configured to estimate at least one of the valve-closing start timing, the valve-closing completion timing, the valve-opening start timing, and the valve-opening completion timing based on the reference timing at the rising start point.

A valve body operation estimation device is applied to a fuel injection valve including a body having an injection hole through which fuel is injected, a valve body that is separated from or seated on a seating surface of the body to open or close the injection hole, and an electromagnetic coil that generates electromagnetic attraction force as valve opening force of the valve body. The valve body operation estimation device is configured to estimate at least one of a valve-closing start timing that the valve body starts valve closing operation upon start of de-energization of the electromagnetic coil, a valve-closing completion timing that the valve closing operation is completed, a valve-opening start timing that the valve body starts valve opening operation upon start of energization of the electromagnetic coil, and a valve-opening completion timing that the valve opening operation is completed. The valve body operation estimation device includes a sampling unit that is configured to obtain at least one of voltage and current of the electromagnetic coil as a plurality of sample values at intervals of a predetermined time in a sampling period set based on a predetermined reference timing, a variation calculation unit that is configured to calculate a degree of variation of the plurality of sample values obtained in the sampling period, a variation waveform which represents a change of the degree of variation caused by shifting the reference timing including a point at which the degree of variation reduces and stops this reduction as the reference timing is delayed, the point referred to as a lower stop point, and a timing estimation unit that is configured to estimate at least one of the valve-closing start timing, the valve-closing completion timing, the valve-opening start timing, and the valve-opening completion timing based on the reference timing at the lower stop point.

BRIEF DESCRIPTION OF DRAWINGS

The above and other objects, features and advantages of the present disclosure will become more apparent from the following detailed description made with reference to the accompanying drawings. In the drawings:

FIG. 12 illustrates diagrams showing a differential waveform according to a seventh embodiment of the present disclosure.

DETAILED DESCRIPTION

Figure 1:
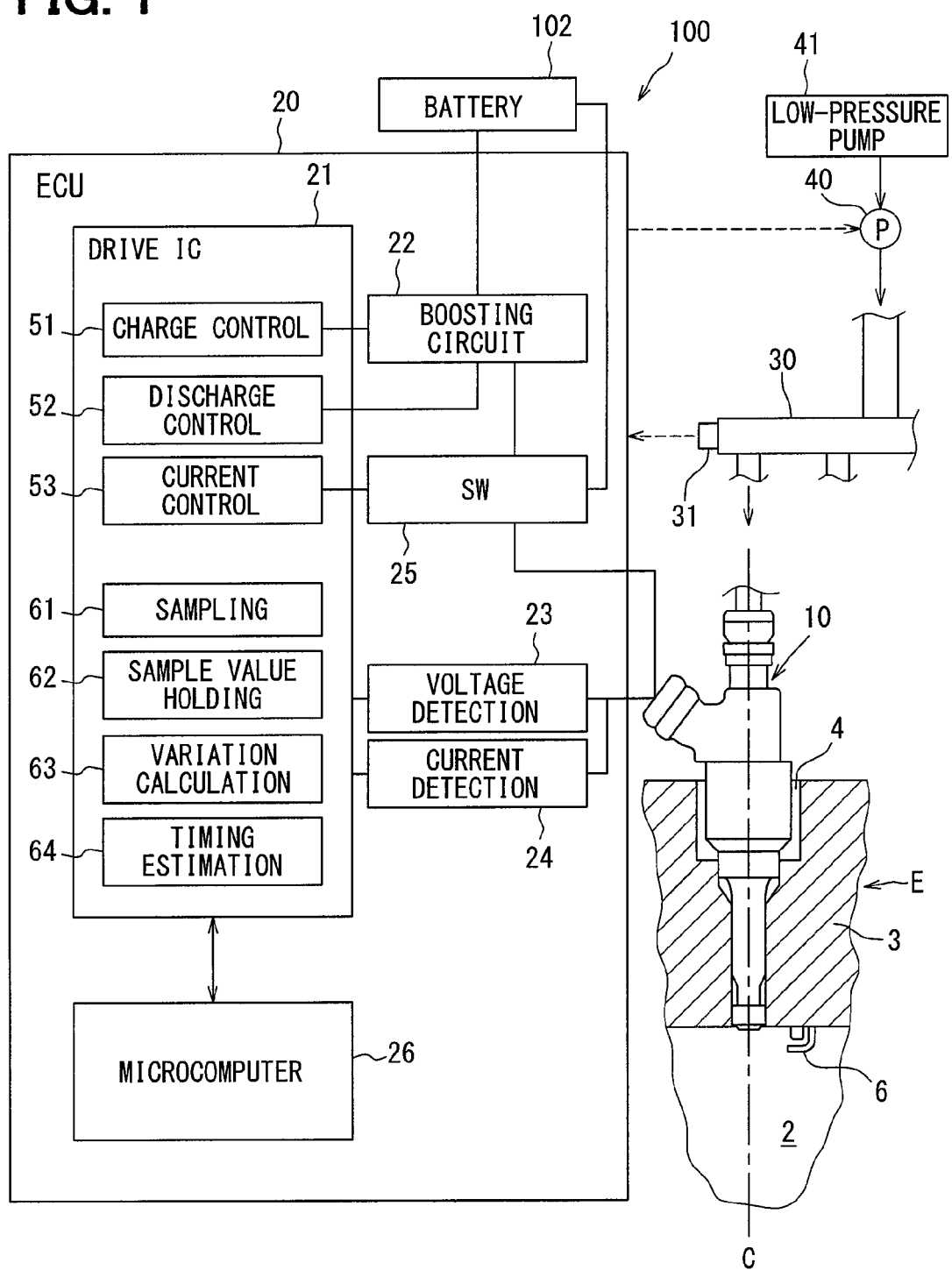
FIG. 1 is a diagram showing a fuel injection system including a valve body operation estimation device according to a first embodiment of the present disclosure.

Hereinafter, a plurality of embodiments of the present disclosure will be described with reference to the drawings. In each embodiment, portions corresponding to those described in the preceding embodiment are denoted by the same reference numerals, and redundant descriptions will be omitted in some cases. In each mode, when only a part of the configuration is described, the other parts of the configuration can be applied with reference to the other modes described above.

In a fuel injection valve of an example, the valve body opens at a timing when a valve opening delay time elapses from a start of energization to the electromagnetic coil, and closes at a timing when a valve closing delay time elapses from a start of de-energization. Therefore, there is a need to set an energization time corresponding to a desired injection amount in consideration of those delay times.

However, the delay times change due to the aging of fuel injection valves, an environment, a variation in a drive circuit, an individual variation, and the like. It is accordingly conceivable that an estimation device estimates the valve closing delay time on-board and sets an energization time with the use of the estimation result, thereby being capable of controlling the injection amount with high accuracy.

The method for the above estimation will be described below. When the electromagnetic coil is de-energized, a voltage value of the electromagnetic coil temporarily increases by a flyback at the time of de-energization, and thereafter gradually decreases. However, when the valve body moves toward the seating surface (valve closing operation) with the de-energization, a movable core attracted by an electromagnetic force moves together with the valve body, thereby generating an induced electromotive force, and a voltage drop after the de-energization becomes slow due to the influence of the induced electromotive force. Immediately before the valve body is seated, a moving speed of the movable core becomes maximum, but at the same time as the seating, the moving speed rapidly decreases. In other words, the moving speed of the movable core changes abruptly at the time of seating in the valve closing operation. As a result, the degree to which the voltage drop slows down due to the influence of the induced electromotive force changes abruptly at the time of seating, and an inflection point appears in a voltage waveform representing a temporal change of a voltage value of the electromagnetic coil.

Therefore, the above estimation device detects the voltage value of the electromagnetic coil to acquire the voltage waveform, and estimates a timing at which a fine movement waveform including the inflection point appears in the voltage waveform as a valve-closing completion timing at which the valve body is seated.

However, the amount of change in the voltage caused by a change in the induced electromotive force described above is very small, and a magnitude of the fine movement waveform described above is extremely small. Further, in the case of partial lift injection in which the valve body starts the valve closing operation before the lift amount of the valve body reaches a full lift, since a change in the moving speed of the movable core at the time of seating becomes small due to the small lift amount at the start of the valve closing operation, the fine movement waveform becomes particularly small. This makes it difficult to accurately extract the fine movement waveform from the voltage waveform, and makes it difficult to estimate the valve-closing completion timing with high accuracy.

The same applies to a case in which the valve opening timing is estimated, and a fine movement waveform appears at a timing when the valve opening operation of the valve body is completed, but the fine movement waveform is extremely small. Therefore, it is difficult to accurately extract the fine movement waveform appearing along with the operation of the valve body and estimate the operation timing of the valve body with high accuracy.

The above estimation device estimates the valve-closing completion timing by the following method. First, the voltage waveform is subjected to a smoothing process so as to remove the fine movement waveform from the voltage waveform. The voltage waveform that has been subjected to the smoothing process is referred to as a reference waveform. Next, a difference waveform, which is a difference between the voltage waveform and the reference waveform, is calculated. A portion of the difference waveform which becomes the inflection point is an appearance timing of the fine movement waveform, and can be estimated as the valve-closing completion timing.

However, it is extremely difficult to set a smoothing coefficient to an optimum value when performing the smoothing process for calculating the reference waveform. In particular, as compared between the partial lift injection and the full lift injection described above, since the voltage waveform at the time of valve closing is greatly different depending on a difference in the lift amount, an optimum value of the smoothing coefficient is also different. For that reason, there is a need to adapt the smoothing coefficient for each driving condition which influences the lift amount, and the adapting operation is extremely difficult.

First Embodiment

A fuel injection system 100 shown in FIG. 1 includes multiple fuel injection valves 10 and an electronic control device (ECU 20). The ECU 20 controls the opening and closing of the multiple fuel injection valves 10, and controls the fuel injection into combustion chambers 2 of an internal combustion engine E. The ECU 20 also functions as a valve body operation estimation device for estimating valve opening and closing timings of the fuel injection valves 10. The multiple fuel injection valves 10 are mounted on an ignition type internal combustion engine E, for example, a gasoline engine, and inject a fuel directly into each of the multiple combustion chambers 2 of the internal combustion engine E. A cylinder head 3 configuring each combustion chamber 2 is provided with a mounting hole 4 penetrating through the cylinder coaxially with an axis line C of the cylinder. The fuel injection valve 10 is inserted into and fixed to the mounting hole 4 so that a tip of the fuel injection valve 10 is exposed to the combustion chamber 2.

A fuel to be supplied to the fuel injection valve 10 is stored in a fuel tank (not shown). The fuel in the fuel tank is pumped up by a low-pressure pump 41, and a fuel pressure is increased by a high-pressure pump 40 and sent to a delivery pipe 30. The high-pressure fuel in the delivery pipe 30 is distributively supplied to the fuel injection valve 10 of each cylinder. An ignition plug 6 is attached to the cylinder head 3 at a position facing the combustion chamber 2. The ignition plug 6 is disposed in the vicinity of a tip of the fuel injection valve 10.

Figure 2:
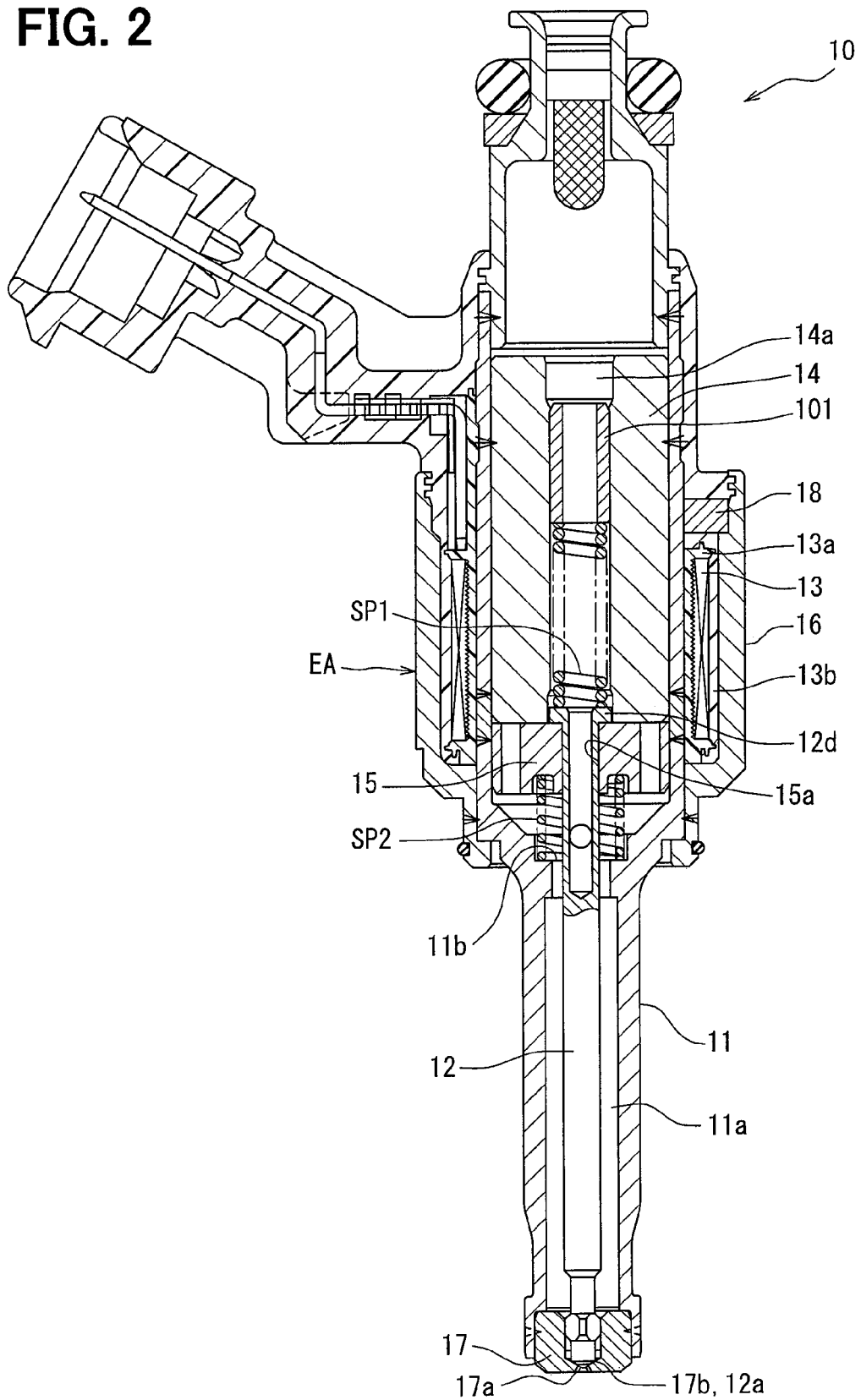
FIG. 2 is a cross-sectional view of a fuel injection valve shown in FIG. 1.

Next, a configuration of the fuel injection valve 10 will be described with reference to FIG. 2. As shown in FIG. 2, the fuel injection valve 10 includes a body 11, a valve body 12, an electromagnetic coil 13, a fixed core 14, a movable core 15, and a housing 16. The body 11 is formed of a magnetic material. A fuel passage 11a is provided inside the body 11.

The valve body 12 is accommodated inside the body 11. The valve body 12 is made of a metal material and is formed in a columnar shape as a while. The valve body 12 is reciprocally displaceable in an axial direction inside the body 11. The body 11 is configured to have a seating surface 17b on which the valve body 12 is seated, and an injection hole 17 in which injection holes 17a for injecting a fuel are defined, on a tip portion of the body 11. The multiple injection holes 17a are provided radially from an inside toward an outside of the body 11. A high-pressure fuel is injected into the combustion chamber 2 through the injection holes 17a.

A main body portion of the valve body 12 has a cylindrical shape. The tip portion of the valve body 12 has a conical shape extending from the tip of the main body portion on the side of the injection holes 17a toward the injection holes 17a. A portion of the valve body 12 seated on the seating surface 17b is a seat surface 12a. The seat surface 12a is formed at the tip portion of the valve body 12.

When the valve body 12 is closed so that the seat surface 12a is seated on the seating surface 17b, the fuel passage 11a is closed and a fuel injection from the injection holes 17a is stopped. When the valve body 12 is operated to open so that the seat surface 12a is separated from the seating surface 17b, the fuel passage 11a is opened and the fuel is injected from the injection holes 17a.

The electromagnetic coil 13 applies a magnetic attraction force in a valve opening direction to the movable core 15. The electromagnetic coil 13 is configured by being wound around a bobbin 13a made of resin, and is sealed with the bobbin 13a and a resin material 13b. In other words, the electromagnetic coil 13, the bobbin 13a, and the resin material 13b configure a cylindrical coil body. The fixed core 14 is formed of a magnetic material in a cylindrical shape, and is fixed to the body 11. A fuel passage 14a is provided in a cylindrical interior of the fixed core 14.

Further, an outer peripheral surface of the resin material 13b for sealing the electromagnetic coil 13 is covered with the housing 16. The housing 16 is made of a metal magnetic material and has a cylindrical shape. A lid member 18 made of a metal magnetic material is attached to an open end portion of the housing 16. As a result, the coil body is surrounded by the body 11, the housing 16, and the lid member 18.

The movable core 15 is held by the valve body 12 so as to be relatively displaceable in a driving direction of the valve body 12. The movable core 15 is formed in a disk shape and made of a metal magnetic material, and is inserted into an inner peripheral surface of the body 11. The body 11, the valve body 12, the coil body, the fixed core 14, the movable core 15, and the housing 16 are disposed so that the respective center lines coincide with each other. The movable core 15 is disposed on the injection holes 17a side of the fixed core 14, and is disposed to face the fixed core 14 so as to have a predetermined gap with the fixed core 14 when the electromagnetic coil 13 is de-energized.

As described above, since the body 11, the housing 16, the lid member 18, and the fixed core 14 surrounding the coil body are made of a magnetic material, those components form a magnetic circuit serving as a passage for a magnetic flux generated by energization of the electromagnetic coil 13. The components such as the fixed core 14, the movable core 15, and the electromagnetic coil 13 correspond to an electrical actuator EA for opening the valve body 12.

A through hole 15a is provided in the movable core 15 and the valve body 12 is inserted into the through hole 15a so that the valve body 12 is assembled to be slidably movable relative to the movable core 15. A locking portion 12d having a diameter expanded from the main body portion is formed at a side end portion on the opposite side of the injection hole, which is an upper side of the valve body 12 in FIG. 2. When the movable core 15 is attracted by the fixed core 14 to move upward, the valve body 12 also moves along with the upward movement of the movable core 15 because the locking portion 12d moves while being locked to the movable core 15. Even when the movable core 15 is in contact with the fixed core 14, the valve body 12 can move relative to the movable core 15 and lift up.

A main spring SP1 is disposed on a side of the valve body 12 opposite to the injection hole, and a sub-spring SP2 is disposed on the injection holes 17a side of the movable core 15. An elastic force of the main spring SP1 is applied to the valve body 12 as a reaction force from an adjustment pipe 101 in a valve closing direction, which is a lower side in FIG. 2. An elastic force of the sub-spring SP2 is applied to the movable core 15 in an attraction direction as a reaction force from a recess portion 11b of the body 11.

The valve body 12 is sandwiched between the main spring SP1 and the seating surface 17b, and the movable core 15 is sandwiched between the sub-spring SP2 and the locking portion 12d. The elastic force of the sub-spring SP2 is transmitted to the locking portion 12d through the movable core 15, and is applied to the valve body 12 in the valve opening direction. Therefore, an elastic force obtained by subtracting a sub elastic force from a main elastic force is applied to the valve body 12 in the valve closing direction.

While the pressure of the fuel in the fuel passage 11a acts on an entire surface of the valve body 12 in a valve open state, the fuel pressure does not act on a surface of the valve body 12 at a downstream side portion of the seat surface 12a in the valve close state. Then, as the valve is opened, the pressure of the fuel flowing into the tip portion gradually rises, and a force for pushing the tip portion toward the valve opening side increases. Therefore, the fuel pressure in the vicinity of the tip portion rises with the opening of the valve, as a result of which the fuel pressure valve closing force decreases. For the reasons described above, a magnitude of the fuel pressure valve closing force is maximum in the valve closed state, and gradually decreases as the valve opening movement amount of the valve body 12 increases.

Next, a behavior resulting from energization of the electromagnetic coil 13 will be described. When an electromagnetic attraction force is generated in the fixed core 14 by energizing the electromagnetic coil 13, the movable core 15 is attracted to the fixed core 14 by the electromagnetic attraction force. As a result, the valve body 12 connected to the movable core 15 opens against the elastic force of the main spring SP1 and the fuel pressure valve closing force.

On the other hand, when the energization of the electromagnetic coil 13 is stopped, the valve body 12 closes the valve in cooperation with the movable core 15 by the elastic force of the main spring SP1.

Next, a configuration of the ECU 20 will be described. The ECU 20 includes a drive IC 21, a boosting circuit 22, a voltage detection unit 23, a current detection unit 24, a switching unit 25, and a microcomputer. The ECU 20 obtains information from various sensors. For example, as shown in FIG. 1, the supply fuel pressure to the fuel injection valve 10 is detected by a fuel pressure sensor 31 attached to the delivery pipe 30, and the detection result is output to the ECU 20. The ECU 20 controls the driving of the high-pressure pump 40 based on the detection result by the fuel pressure sensor 31.

The microcomputer 26 includes a processor, a nonvolatile memory (ROM), a volatile memory (RAM), and the like, and calculates a required injection amount of fuel and a required injection start timing based on a load of the internal combustion engine E and an engine rotation speed. The drive IC 21 is a driving integrated circuit for controlling the driving of the fuel injection valve 10, and controls the operation of the boosting circuit 22 and the switching unit 25 in accordance with command signals output from the microcomputer 26, to thereby control a state of supplying an electric power to the electromagnetic coil 13.

Specifically, an injection characteristic indicating a relationship between an energization time Ti and an injection amount Q to the electromagnetic coil 13 is tested and stored in the ROM in advance. The microcomputer 26 outputs a pulse signal of the energization time Ti corresponding to the required injection amount to the drive IC 21 as an injection command signal in accordance with the injection characteristic. The drive IC 21 controls the injection amount Q by controlling the energization times Ti in accordance with the injection command signal. In other words, the energization time of the electromagnetic coil 13 is controlled according to a pulse on period (pulse width) of the injection command signal.

The voltage detection unit 23 and the current detection unit 24 detect values of a voltage and a current applied to the electromagnetic coil 13, and outputs the detection result to the drive IC 21. The voltage detection unit 23 detects a potential difference between a positive terminal and a negative terminal of the electromagnetic coil 13 as a coil voltage. When the current to be supplied to the electromagnetic coil 13 is cut off, a flyback voltage is generated in the electromagnetic coil 13. Further, an induced electromotive force is generated in the electromagnetic coil 13 by cutting off the current and displacing the valve body 12 and the movable core 15 in the valve closing direction. Therefore, with the de-energization of the electromagnetic coil 13, a voltage obtained by superimposing the voltage caused by the induced electromotive force on the decreasing flyback voltage is generated in the electromagnetic coil 13. Therefore, the voltage detection unit 23 detects, as a voltage value, a change in the induced electromotive force caused by the displacement of the valve body 12 and the movable core 15 in the valve closing direction by cutting off the current to be supplied to the electromagnetic coil 13. Further, the voltage detection unit 23 also detects, as a voltage value, a change in the induced electromotive force due to the relative displacement of the movable core 15 to the valve body 12 after the seating surface 17b and the valve body 12 come into contact with each other.

The drive IC 21 estimates the valve-closing completion timing and the valve-opening completion timing of the valve body 12. The valve-closing completion timing is a timing at which the valve closing operation is completed after the valve body 12 starts the valve closing operation in accordance with a start of de-energization of the electromagnetic coil 13, that is, a timing at which the seat surface 12a comes into contact with the seating surface 17b. The valve opening completion timing is a timing at which the valve opening operation is completed after the valve body 12 starts the valve opening operation in accordance with a start of the energization of the electromagnetic coil 13, that is, a timing at which the movable core 15 comes into contact with the fixed core 14 and a gap between the two cores is minimized. The estimation method of those timings will be described later in detail.

The drive IC 21 includes a charge control unit 51, a discharge control unit 52, a current control unit 53, a sampling unit 61, a sample value holding unit 62, a variation calculation unit 63, and a timing estimation unit 64. The boosting circuit 22 and the switching unit 25 operate on the basis of a drive command signal output from the drive IC 21. The drive command signal is a signal for commanding an energization state of the electromagnetic coil 13 of the fuel injection valve 10, and is set based on the above-described injection command signal output from the microcomputer 26.

The boosting circuit 22 applies the boosted boost voltage to the electromagnetic coil 13. The boosting circuit 22 includes a boosting circuit coil, a capacitor, and a switching element, and the battery voltage applied from the battery terminal of the battery 102 is boosted by the boosting circuit coil and stored in the capacitor. The voltage of the electric power boosted and stored in this manner corresponds to a boost voltage.

When the discharge control unit 52 turns on a predetermined switching element so that the boosting circuit 22 discharges, the boost voltage is applied to the electromagnetic coil 13 of the fuel injection valve 10. When stopping the voltage application to the electromagnetic coil 13, the discharge control unit 52 turns off a predetermined switching element of the boosting circuit 22.

The current control unit 53 controls on/off of the switch unit 25 with the use of the detection result of the current detection unit 24 to control the current flowing through the electromagnetic coil 13. The switch unit 25 applies the boost voltage or the battery voltage to the electromagnetic coil 13 when the switch unit 25 is turned on and stops applying the voltage when the switch unit 25 is turned off. The current control unit 53 turns on the switch unit 25 and applies the boost voltage to start energization, for example, at a voltage application start timing commanded by the drive command signal. Then, the coil current increases with the start of energization. When the current detection unit 24 detects that the increased coil current reaches a first target value, the current control unit 53 turns off the energization. Thereafter, the current control unit 53 switches from the boost voltage to the battery voltage, and controls the coil current to be maintained at a second target value set to a value lower than the first target value. In short, a control is performed so as to increase the coil current to the first target value by applying the boost voltage by a first energization, and thereafter, the coil current is held at the second target value.

A solid line shown in FIG. 3(a) is a voltage waveform Wa indicating a change in the coil voltage detected by the voltage detection unit 23. The voltage waveform Wa is a waveform in a state in which noise is removed by performing a smoothing process on the actually detected voltage waveform. As shown in the figure, the coil voltage increases by the flyback voltage at an energization completion time Toff, which is a completion timing of the energization time Ti, and thereafter, the coil voltage gradually drops and converges to zero. In such a period of voltage drop, the movable core 15 begins to move along with the valve body 12 at a valve-closing start timing Tcla when a response delay time elapses from the energization completion time Toff. Then, an induced electromotive force is generated by the movement of the movable core 15, and the voltage drop after the energization is turned off becomes slow due to an influence of the induced electromotive force. In other words, the voltage waveform Wa is not lowered as in a virtual waveform Wx indicated by a dotted line, and is obtained by adding the induced electromotive force to the virtual waveform Wx. While a moving speed of the movable core 15 becomes maximum immediately before the valve body 12 is seated, the moving speed of the movable core 15 rapidly decreases at a valve-closing completion timing Tcl at which the valve body 12 is seated. In other words, at the time of seating, the moving speed of the movable core 15 changes abruptly, and the induced electromotive force also changes abruptly with the change in the moving speed. As a result, the degree to which the voltage drop slows down due to the influence of the induced electromotive force changes abruptly at the time of seating, and an inflection point appears in the voltage waveform Wa at the valve-closing completion timing Tcl.

Figure 3:
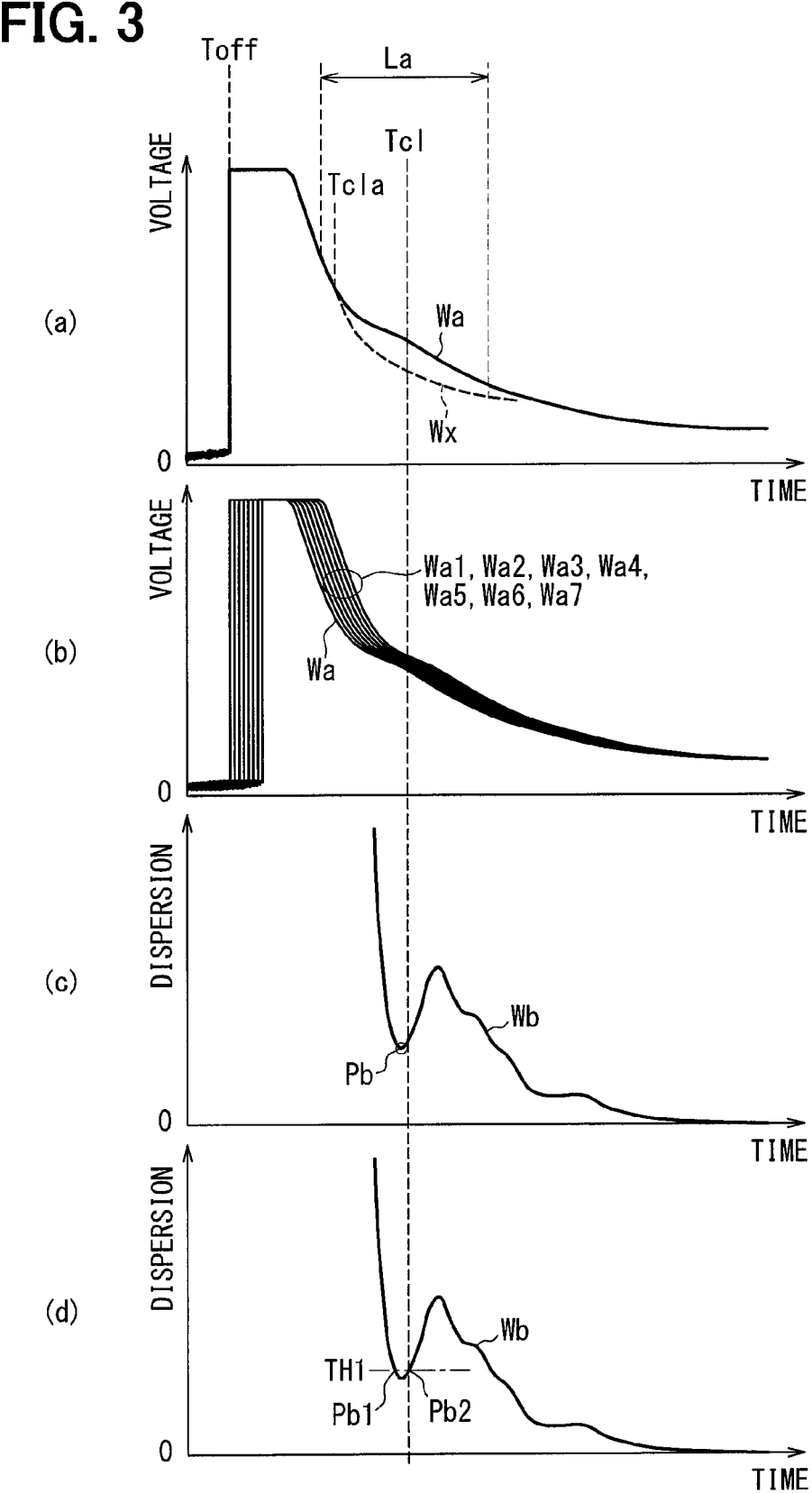
FIG. 3 illustrates diagrams showing a relationship between a waveform of a voltage sampled by a sampling unit of FIG. 1 and a variation waveform based on the voltage waveform.

Incidentally, the induced electromotive force described above starts to occur at the valve-closing start timing Tcla shown in FIG. 3. Further, since the movable core 15 is assembled so as to be movable relative to the valve body 12, the movable core 15 continues to move even after the valve-closing completion timing Tcl, and the induced electromotive force continues to be generated. However, after the valve-closing completion timing Tcl, the elastic force of the sub-spring SP2 acts on the movable core 15, as a result of which the moving speed of the movable core 15 rapidly decreases and the induced electromotive force also rapidly decreases.

The sampling unit 61 acquires the values of the coil voltage at predetermined time L intervals (refer to FIG. 4) in a predetermined period La after the energization completion time Toff. The predetermined time L interval is, for example, 1 μsec, and is set to a time shorter than the calculation cycle of the microcomputer 26.

Figure 4:
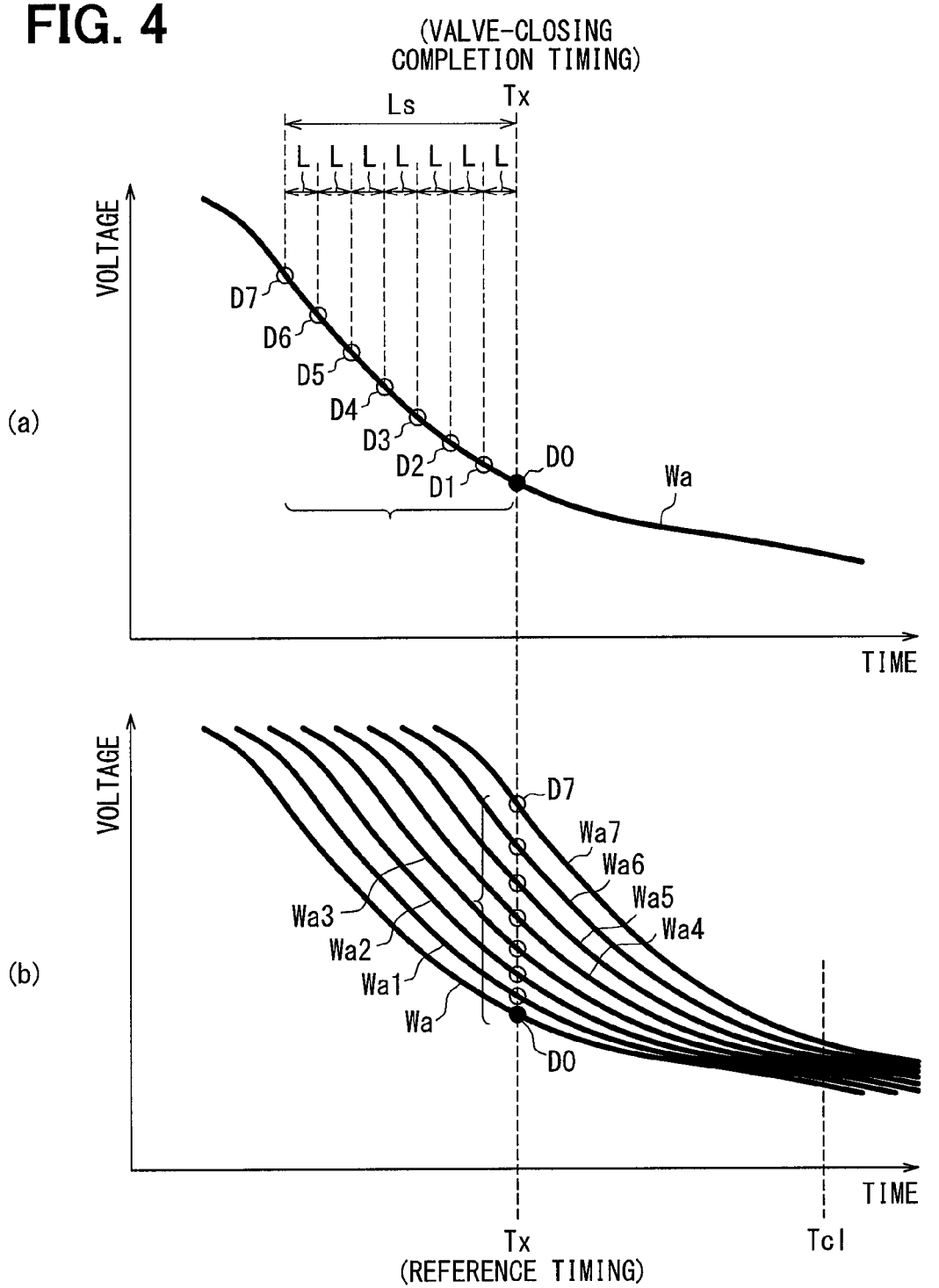
FIG. 4 illustrate diagrams showing a relationship between a sample value involved in the voltage waveforms of FIG. 3 and the degree of variation in a sample value.

The sample value holding unit 62 temporarily stores and holds multiple voltage values acquired by the sampling unit 61. Specifically, the sample value holding unit 62 erases the storing until the voltage value in the predetermined period La involved in the next fuel injection is acquired. For example, the next voltage value is overwritten with the current voltage value. As shown in FIG. 4(a), a reference timing Tx is arbitrarily set in the predetermined period La, and the voltage value obtained in a sampling period Ls set with reference to the reference timing Tx is used as a sample value. Specifically, the voltage value included in the sampling period Ls before the reference timing Tx is used as the sample value. In an example of FIG. 4, the sampling period Ls is set so that eight sample values D0, D1, D2, D3, D4, D5, D6, and D7 are obtained.

The variation calculation unit 63 calculates the degree of variation of the multiple sample values D0 to D7 in the sampling period Ls. Specifically, the variation calculation unit 63 calculates dispersion of the multiple sample values D0 to D7 as the degree of variation. More specifically, the variation calculation unit 63 calculates an average value of the multiple sample values D0 to D7, calculates the deviations between the average value and the respective sample values, divides a value obtained by adding the square of the respective deviations by the number of samples (8), and calculate a value of the dispersion described above.

FIG. 4(b) visualizes the degree of variation of the multiple sample values D0 to D7, and reference numerals Wa1, Wa2, Wa3, Wa4, Wa5, Wa6, and Wa7 in the drawing are obtained by enlarging pseudo waveforms Wa1 to Wa7 shown in FIG. 3(b). The pseudo waveforms Wa1 to Wa7 are waveforms obtained by shifting the voltage waveform Wa detected by the voltage detection unit 23 by a predetermined time L. Among the pseudo waveforms Wa1 to Wa7 and the voltage waveform Wa, the voltage value at the reference timing Tx corresponds to the sample values D0 to D7. Therefore, if the reference timing Tx is shifted, the sample values D0 to D7 change and the degree of variation also changes.

FIG. 3(c) shows a variation waveform Wb representing a change in the dispersion value attributable to a difference in the reference timing Tx. The variation waveform Wb in a portion corresponding to the predetermined period La includes a rising start point Pb at which the dispersion value is lowered as the reference timing Tx is delayed and the lowering stops, and at which the dispersion value starts to rise after the lowering stops. In short, the variation waveform Wb exemplified in FIG. 3 has a shape having a minimum point.

The timing estimation unit 64 estimates the valve-closing completion timing Tcl based on the reference timing Tx at the rising start point Pb. In view of the fact that the reference timing Tx at the rising start point Pb is highly correlated with the valve-closing completion timing Tcl, the timing estimation unit 64 estimates the reference timing Tx at the rising start point Pb as the valve-closing completion timing Tcl. Specifically, as shown in FIG. 3(d), the timing estimation unit 64 extracts a lowering point Pb1 at which the dispersion value has dropped to a threshold TH1 or less, and a rising point Pb2 at which the dispersion value has risen to the threshold TH1 or more after the lowering point Pb1. Then, the timing estimation unit 64 calculates the reference timing Tx at the rising start point Pb, that is, the valve-closing completion timing Tcl based on the reference timing Tx at the rising point Pb2. For example, the timing estimation unit 64 calculates a timing obtained by subtracting a predetermined time set in advance from the reference timing Tx at the rising point Pb2 as the valve-closing completion timing Tcl. Alternatively, the timing estimation unit 64 calculates a timing obtained by multiplying the reference timing Tx at the rising point Pb2 by a coefficient set in advance as the valve-closing completion timing Tcl.

An injection characteristic map representing a relationship between the energization hour Ti and the injection amount is divided into a full lift region in which the energization time Ti is relatively long and a partial lift region in which the energization time Ti is relatively short. In the full lift region, the valve body 12 opens the valve until the lift amount of the valve body 12 reaches a full lift position, that is, the movable core 15 reaches a position to abut against the fixed core 14, and the valve body 12 starts to close the valve from the abutting position. On the other hand, in the partial lift region, the valve body 12 open the valve to a partial lift state in which the lift amount of the valve body 12 does not reach the full lift position, that is, to a position before the movable core 15 abuts against the fixed core 14, and starts to close the valve from the partial lift position.

The voltage waveform Wa illustrated in FIG. 3 is a waveform obtained at the time of injection in the partial lift region, whereas a voltage waveform Wa 40 illustrated in FIG. 5(a) is a waveform obtained at the time of injection in the full lift region. In addition, the voltage waveforms Wa10, Wa20, and Wa30 are waveforms acquired at the time of injection in the partial lift region. The energization times Ti become shorter in the order of the voltage waveforms Wa30, Wa20, and Wa10, and the lift amount of the valve body 12 becomes smaller. The variation waveforms Wb10, the Wb20, the Wb30, and the Wb40 shown in FIG. 5(b) correspond to the voltage waveforms Wa10, Wa20, Wa30, and Wa40, respectively.

As can be understood by comparing the variation waveforms Wb10, Wb20, and Wb30 in the partial lift region with each other, as the lift amount is larger, a slope of the waveform in the vicinity of the rising start point Pb which becomes the minimum becomes gentle. Unlike the waveform having the minimum, the variation waveform Wb40 in the full lift region is a waveform including a portion where a lowering stop state is continued. In the case of the variation waveform Wb40, a point at which the dispersion value is lowered and the lowering stops when the reference timing Tx is delayed is defined as a lower stop point Pby, and a change point at which the dispersion value turns to rise when the reference timing Tx is further delayed is defined as a rising start point Pbx.

In view of the fact that the reference timing Tx at the rising start point Pbx is highly correlated with the valve-closing completion timing Tcl, the timing estimation unit 64 estimates the reference timing Tx at the rising start point Pbx as the valve-closing completion timing Tcl. The specific estimation method is the same as the method described with reference to FIG. 3(d), and extracts a lowering point Pb1 whose dispersion value is lowered to a threshold TH1 or less and a rising point Pb2 whose dispersion value rises to the threshold TH1 or more after the lowering point Pb1. Since the rising point Pb2 and the rising start point Pbx have a high correlation, the valve-closing completion timing Tcl is calculated based on the reference timing Tx at the rising point Pb2.

In addition to estimating the valve-closing completion timing Tcl by the method shown in FIGS. 3 and 5, the drive IC 21 also estimates a valve-opening completion timing Top by a method which will be described below. In other words, the drive IC 21 switchingly performs the estimation of the valve closing timing and the estimation of the valve opening timing.

Figure 6:
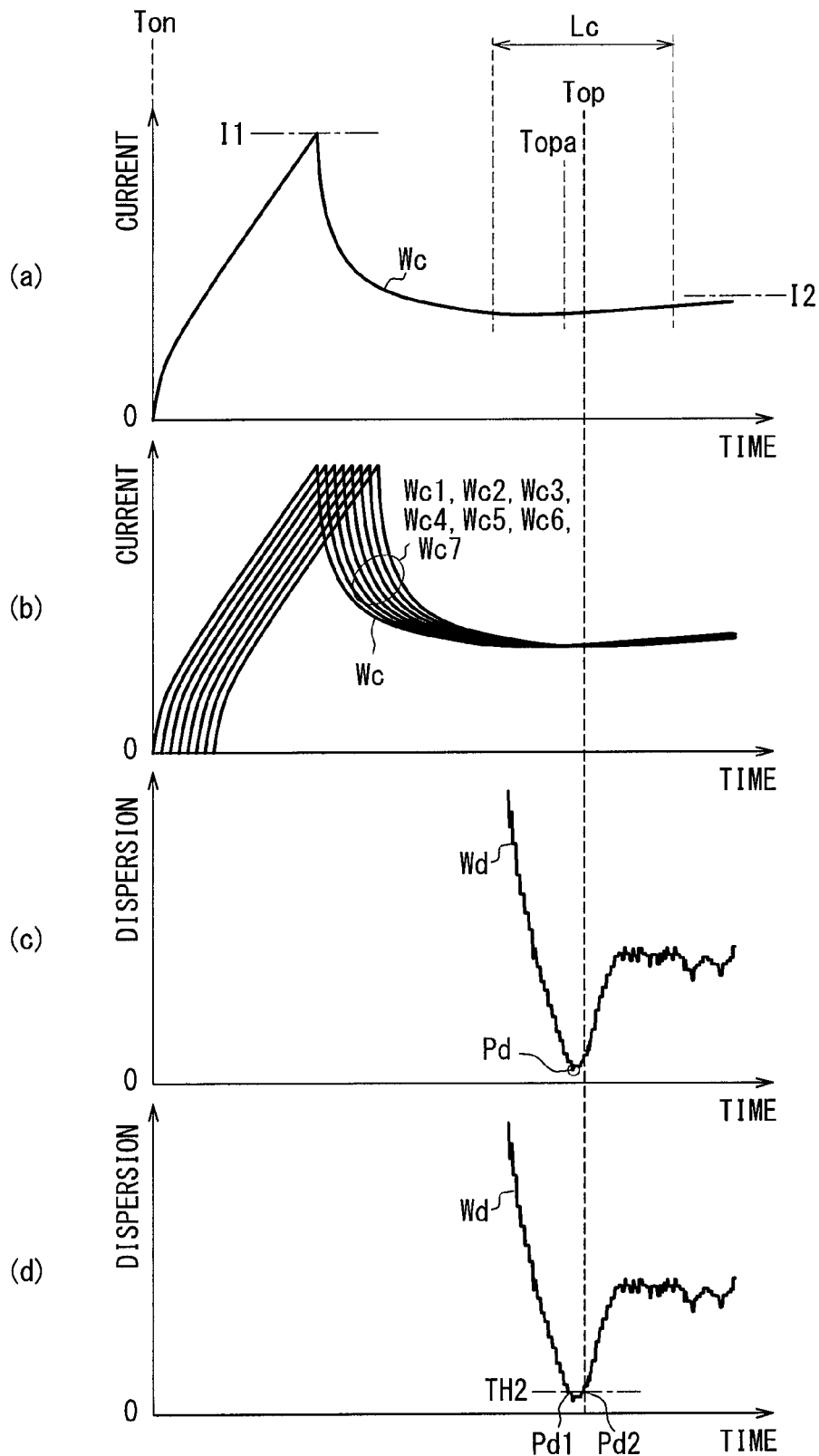
FIG. 6 illustrates diagrams showing a relationship between a waveform of a current sampled by a sampling unit of FIG. 1 and a variation waveform based on the current waveform.

A solid line shown in FIG. 6(a) is a current waveform Wc indicating a change of the coil current detected by the current detection unit 24 with an elapsed time. The current waveform Wc is a waveform in a state in which noise is removed by performing a smoothing process on the actually detected current waveform. As shown in the figure, the coil current rises with the energization start time Ton, which is a start timing of the energization time Ti. Thereafter, when the coil current reaches the first target value I1 described above, the boost voltage is switched to the battery voltage, and the coil current is held at the second target value I2. During a current holding period, the valve opening completion timing Top appears. Although the valve opening start timing Topa appears during the current holding period in the example of FIG. 6, the valve opening start timing Topa may appear during a current rising period up to the first target value I1.

Pseudo waveforms Wc1 to Wc7 shown in FIG. 6(b) are waveforms obtained by shifting the current waveform Wc detected by the current detection unit 24 by a predetermined time L. FIG. 6(c) shows a variation waveform Wd representing a change in the dispersion value due to a difference in the reference timing Tx. The variation waveform Wd of the portion corresponding to a predetermined period Lc includes a rising start point Pd at which the dispersion value is lowered as the reference timing Tx is delayed and thereafter rises. In short, the variation waveform Wd exemplified in FIG. 6 has a shape having a local minimum value, and the local minimum value corresponds to a dispersion value at the rising start point Pd of the variation waveform Wd.

The sampling unit 61 at the time of estimating the valve opening timing acquires the value of the coil current instead of the coil voltage. Specifically, as shown in FIG. 6, in a predetermined period Lc after the energization start time Ton, the sampling unit 61 acquires the value of the coil current at a predetermined time L interval (for example, 1 μsec).

The sample value holding unit 62 at the time of estimating the valve opening timing temporarily stores and holds the multiple current values acquired by the sampling unit 61. Specifically, the sample value holding unit 62 erases the storing until the current value in the predetermined period Lc involved in the next fuel injection is acquired. For example, the sample value holding unit 62 overwrites a current value of a next time with the current value of the current time. In the same manner as in FIG. 4(a), the sample value holding unit 62 arbitrarily sets the reference timing Tx in the predetermined period Lc, and sets the current value obtained in the sampling period Ls set with reference to the reference timing Tx as a sample value. Specifically, the sample value holding unit 62 sets the current value included in the sampling period Ls before the reference timing Tx as the sample value.

The variation calculation unit 63 at the time of estimation of the valve opening timing calculates the degree of variation of the multiple sample values in the sampling period Ls in the same manner as at the time of estimation of the valve closing timing. Specifically, the variation calculation unit 63 calculates the dispersion of the multiple sample values as the degree of variation.

The timing estimation unit 64 at the time of estimating the valve opening timing estimates the valve opening completion timing Top based on the reference timing Tx at the rising start point Pd. In view of the fact that the reference timing Tx at the rising start point Pd is highly correlated with the valve opening completion timing Top, the timing estimation unit 64 estimates the reference timing Tx at the rising start point Pd as the valve opening completion timing Top. More specifically, the timing estimation unit 64 extracts a lowering point Pd1 at which the dispersion value has been lowered to a threshold TH2 or less, and a rising point Pd2 at which the dispersion value has risen to the threshold TH2 or more after a lowering point Pd1. Then, the timing estimation unit 64 calculates the reference timing Tx at the rising start point Pd, that is, the valve opening completion timing Top based on the reference timing Tx at the rising point Pd2. For example, the timing estimation unit 64 calculates a timing obtained by subtracting a predetermined time set in advance from the reference timing Tx at the rising point Pd2 as the valve opening completion timing Top. Alternatively, the timing estimation unit 64 calculates a timing obtained by multiplying the reference timing Tx at the rising point Pd2 by a coefficient set in advance as the valve opening completion timing Top.

Next, a procedure of a process of estimating the valve-closing completion timing Tcl and the valve-opening completion timing Top by the drive IC 21 will be described with reference to FIG. 7. The drive IC 21 has a memory for storing a predetermined program, and a processor for performing calculation processing according to the memory, and the processor executes the processing of FIG. 7.

Figure 7:
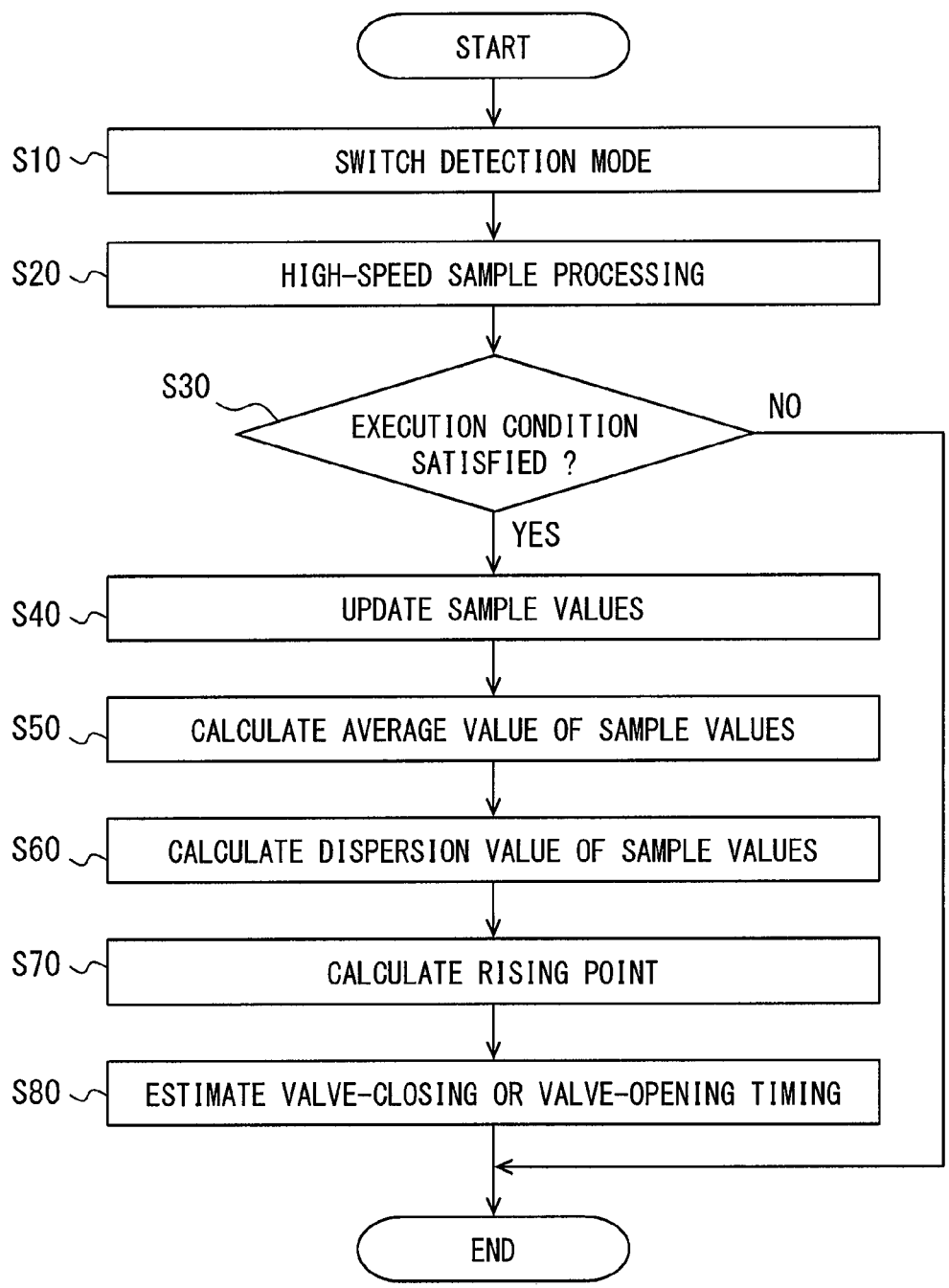
FIG. 7 is a flowchart showing a procedure of a process in which an drive IC of FIG. 1 estimates a valve closing timing and a valve opening timing.

First, in Step S10 of FIG. 7, a mode is switched between a voltage detection mode for detecting the voltage waveform Wa and a current detection mode for detecting the current waveform Wc. In the present embodiment, the mode is switched such that a frequency of executing the voltage detection mode is higher than a frequency of executing the current detection mode. This is because the valve opening timing is not greatly influenced by a difference in the length of the energization time Ti, whereas the valve closing timing is greatly influenced by the difference in the length of the energization time Ti, and therefore it is desirable to estimate the valve opening timing at a high frequency.

Subsequently, in Step S20, the voltage waveform Wa or the current waveform Wc is acquired in accordance with a detection mode set in Step S10. The drive IC 21 when the process of Step S20 is executed corresponds to the sampling unit 61, and the voltage waveform Wa or the current waveform Wc is acquired by acquiring the voltage value or the current value by high-speed processing, for example, at intervals of 1 μsec.

In the following Step S30, it is determined whether or not an execution condition of a timing estimation is satisfied. The execute condition is a condition in which an influence on a relationship between the energization time Ti and the injection amount is small, and for example, a condition in which a variation in a physical quantity exemplified as follows falls within a predetermined range is set as the execution condition. The physical quantity includes a pressure of the fuel to be supplied to the fuel injection valve 10, a rotation speed of the internal combustion engine E, a load of the internal combustion engine E, a fuel injection amount, and the like.

In the following Step S40, the multiple voltage values configuring the voltage waveform Wa acquired in Step S20 or the multiple current values configuring the current waveform Wc are stored in a memory of the drive IC 21. This memory corresponds to the sample value holding unit 62 shown in FIG. 1. When the voltage value or the current value involved in the previous injection is stored in the memory, the current value is overwritten with the previous value and stored.

In the following Step S50, an average value of the multiple sample values in the sampling period Ls described above is calculated. Specifically, values included in the sampling period Ls corresponding to an arbitrary reference timing Tx are extracted from multiple voltage values or current values stored in the memory, and an average value of the extracted multiple values is calculated. The extracted multiple values correspond to the sample values D0 to D7 described above. Then, the sampling period Ls is shifted by shifting the reference timing Tx by a predetermined time L, and an average value corresponding to each sampling period Ls is calculated.

In the following Step S60, the dispersion values of the multiple sample values D0 to D7 extracted for each sampling period Ls are calculated with the use of the average value calculated in Step S50. Specifically, a deviation between the average value calculated in Step S50 and each of the sample values D0 to D7 is calculated, and a value obtained by adding the square of each deviation is divided by the number of samples to calculate a dispersion value. The dispersion value is calculated for each sampling period Ls. The drive IC 21 when the processes of Steps S50 and S60 are executed corresponds to the variation calculation unit 63, and the dispersion value calculated in Step S60 corresponds to the degree of variation.

In the following Step S70, in the variation waveforms Wb and Wd representing a relationship between the reference timing Tx and the dispersion values, the rising points Pb2 and Pd2 at which the dispersion value rises from less than the thresholds TH1 and TH2 to the thresholds TH1 and TH2 or more are calculated. In Step S10, when the detection mode is switched to the voltage detection mode, the rising point Pb2 is calculated with the use of the threshold TH1 based on the voltage waveform Wa, and when the mode is switched to the current detection mode, the rising point Pd2 is calculated with the use of the threshold TH2 based on the current waveform Wc.

In the following Step S80, when the detection mode is switched to the voltage detection mode in Step S10, the valve-closing completion timing Tcl is estimated based on the rising point Pb2 calculated in Step S70. On the other hand, when the detection mode is switched to the current detection mode in Step S10, the valve opening completion timing Top is estimated based on the rising point Pd2 calculated in Step S70. Specifically, a timing obtained by subtracting a predetermined time or multiplying a predetermined coefficient from or by the reference timing Tx at the rising point Pd2 is calculated as the valve opening completion timing Top. The drive IC 21 when the processes of Steps S70 and S80 are executed corresponds to the timing estimation unit 64.

The valve-closing completion timing Tcl and the valve-opening completion timing Top estimated as described above are used to correct the value of the map indicating the relationship between the energization time Ti and the injection amount. Since the map is used for setting the energization time Ti with respect to a target injection amount, the injection amount can be controlled with high accuracy by correcting the map based on the on-board estimated valve opening and closing timings.

As described above, according to the present embodiment, the dispersion value indicating the degree of variation of the voltage value in the sampling period Ls is calculated. Then, the valve-closing completion timing Tcl is estimated based on the reference timing Tx at the rising start point Pb of the variation waveform Wb representing the relationship between the reference timing Tx and the dispersion value. The reference timing Tx at the rising start point Pb has a correlation with the valve-closing completion timing Tcl, and the rising start point Pb having such a correlation remarkably appears in the variation waveform Wb. Therefore, according to the present embodiment, the rising start point Pb appearing in the variation waveform Wb can be extracted with high accuracy, and consequently, the valve-closing completion timing Tcl can be estimated with high accuracy.

In this example, in the case of injection in the partial lift region, the lift amount changes in accordance with the energization time Ti, and the voltage waveform Wa at the time of valve closing greatly differs in accordance with the change in the lift amount. For that reason, in the estimation device as the comparative example described below, it is extremely difficult to accurately estimate the valve-closing completion timing.

In the estimation device according to the comparative example, first, the voltage waveform Wa is acquired as shown in FIG. 8(a). Since an appearance timing of the fine movement waveform included in the voltage waveform Wa is the valve-closing completion timing Tcl, if the appearance timing of the fine movement waveform can be extracted, the valve-closing completion timing Tcl can be estimated. Therefore, first, a reference waveform Wn (refer to FIG. 8(b)) obtained by subjecting the voltage waveform Wa to a smoothing process so as to remove the fine movement waveform from the voltage waveform Wa is calculated. Next, a difference waveform WD1 (refer to FIG. 8(b)), which is a difference between the voltage waveform Wa and the reference waveform Wn, is calculated. A portion where the difference is the largest can be regarded as the appearance timing of the fine movement waveform. That is, a point that is an extreme value of the difference waveform WD1 is the appearance timing of the fine movement waveform and regarded as the valve-closing completion timing Tcl.

Figure 8:
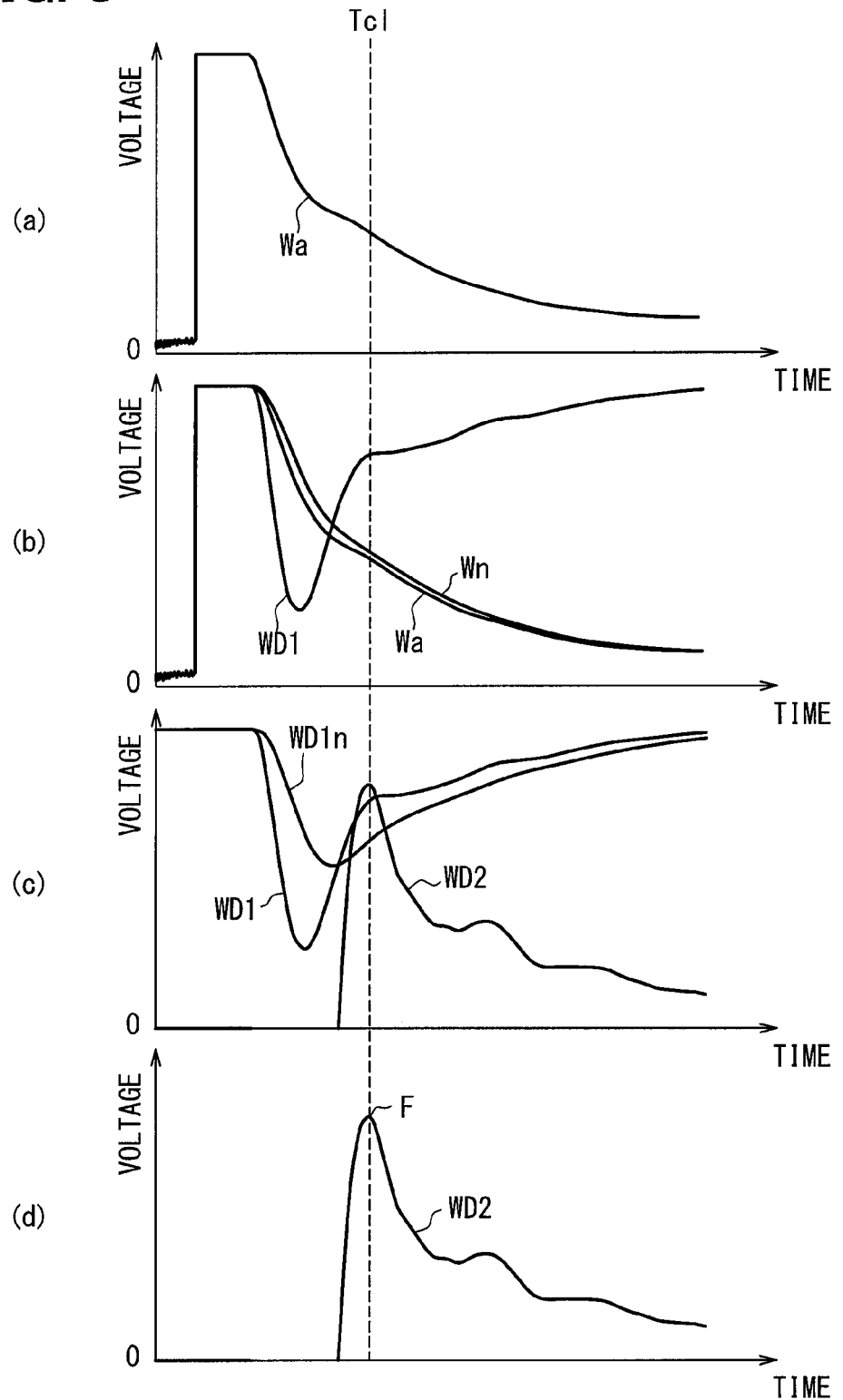
FIG. 8 illustrates diagrams illustrating a method of estimating a valve closing timing according to a comparative example to the present disclosure, and shows a voltage waveform, a reference waveform obtained by smoothing the voltage waveform, and a difference waveform which is a difference between the voltage waveform and the reference waveform.

In the example of FIG. 8, the following processing is further performed in order to accurately extract a point that becomes the extreme value of the difference waveform WD1. In other words, the reference waveform WD1n (refer to FIG. 8(c)) obtained by performing the smoothing process on the difference waveform WD1 is calculated. Next, a difference waveform WD2 (refer to FIG. 8(c)), which is a difference between the difference waveform WD1 and the reference waveform WD1n, is calculated. A portion largest in the difference is a point F (refer to FIG. 8(d)) that is an extreme value of the difference waveform WD1. In other words, that the point F, which becomes the extreme value of the difference waveform WD2, is a timing at which to obtain the extreme value of the difference waveform WD1, and the timing is the appearance timing of the fine movement waveform, and regarded as the valve-closing completion timing Tcl.

However, in the estimation device according to the above comparative example, it is difficult to set a smoothing coefficient to an optimum value when performing the smoothing process for calculating the reference waveforms Wn and WD1n. In particular, since the voltage waveform Wa at the time of valve closing greatly differs according to a change in the lift amount as described above, an optimum value of the smoothing coefficient also differs according to the lift amount, and therefore setting of the smoothing coefficient is extremely difficult.

Figure 9:
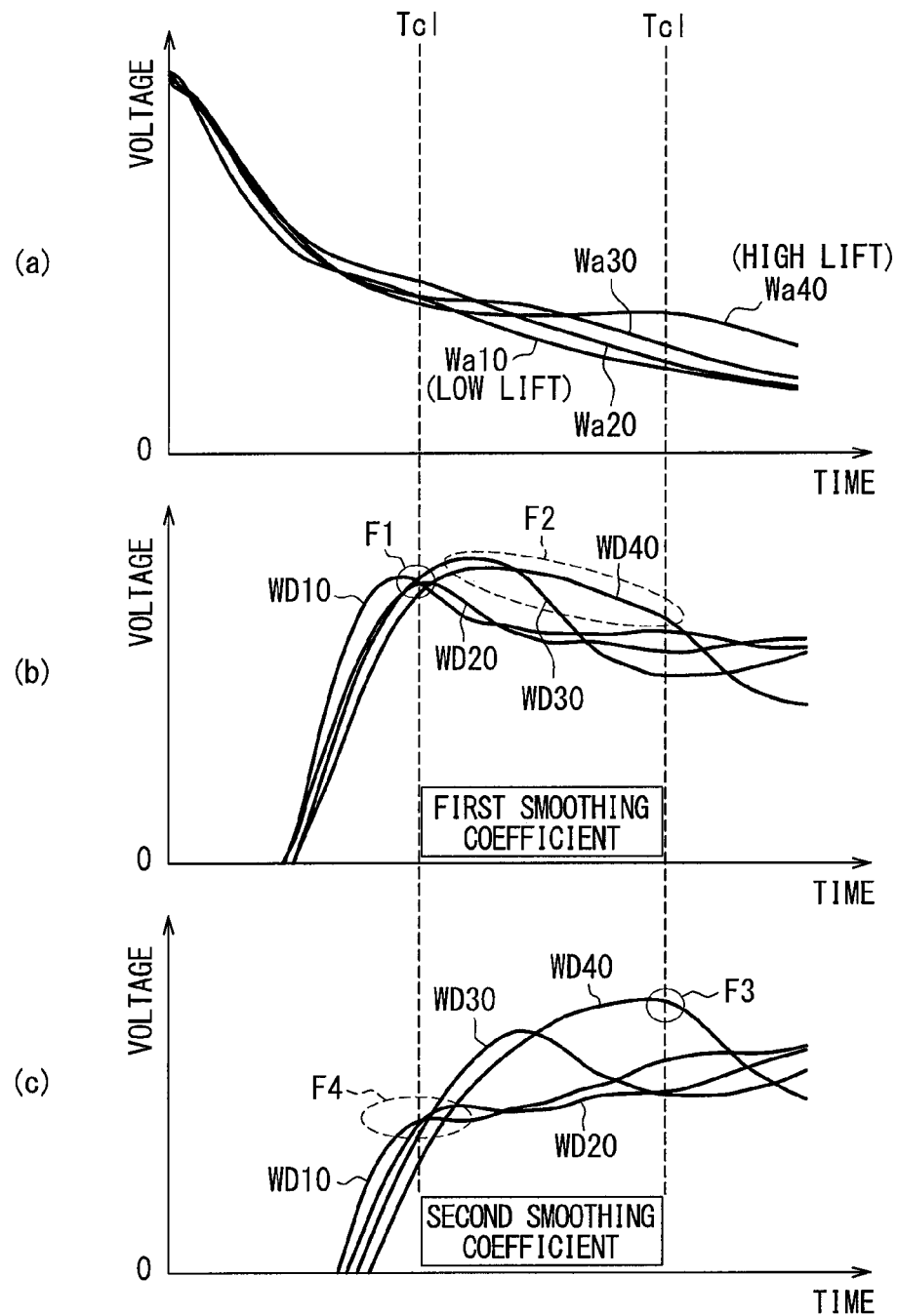
FIG. 9 illustrates diagrams illustrating a difference in difference waveforms according to different reference waveforms and different valve body lift amounts in FIG. 8.

For example, the voltage waveforms Wa10, Wa20, Wa30, and Wa40 shown in FIG. 9(a) are the same as the voltage waveforms shown in FIG. 5(a). However, the shapes of the generated reference waveforms Wn and WD1n differ between the case where a first smoothing coefficient is used and the case where a second smoothing coefficient is used for those voltage waveforms.

Then, in the case of the difference waveforms WD10 to WD40 based on the reference waveforms Wn and WD1n with the use of the first smoothing coefficient, as shown in FIG. 9(b), an extreme value F1 appears remarkably at the time of low lift, so that the valve-closing completion timing Tcl can be estimated with high accuracy. However, at the time of high lift, since an extreme value F2 does not appear remarkably, the valve-closing completion timing Tcl cannot be estimated with high accuracy.

On the other hand, in the case of the difference waveform WD10 to WD40 based on the reference waveforms Wn and WD1n with the use of the second smoothing coefficient, as shown in FIG. 9(c), an extreme value F3 appears remarkably at the time of high lift, so that the valve-closing completion timing Tcl can be estimated with high accuracy. However, at the time of low lift, since an extreme value F4 does not appear remarkably, the valve-closing completion timing Tcl cannot be estimated with high accuracy.

As described above, in the estimation device according to the comparative example, it is difficult to set the smoothing coefficient to an optimum value according to the lift amount, resulting in a problem that the valve-closing completion timing Tcl cannot be estimated with high accuracy in the partial lift region. To cope with the above problem, in the present embodiment in which the estimation is performed based on the variation waveform Wb, as shown in FIG. 5, even if the lift amounts are different from each other, a remarkable rising start point Pb or lower stop point Pby appears in the variation waveform Wb10 to Wb40. Therefore, even in the partial lift region, the valve-closing completion timing Tcl can be estimated with high accuracy. In addition, since the reference waveforms Wn and WD1n are unnecessary, the estimation of the timings described above can be realized while the adaptation operation of the smoothing coefficients is not required.

Further, in the present embodiment, a dispersion value indicating the degree of variation of the current value in the sampling period Ls is calculated. Then, the valve opening completion timing Top is estimated based on the reference timing Tx at the rising start point Pd of the variation waveform Wd representing the relationship between the reference timing Tx and the dispersion value. The reference timing Tx at the rising start point Pd has a correlation with the valve opening completion timing Top, and the rising start point Pd having such a correlation remarkably appears in the variation waveform Wd. Therefore, according to the present embodiment, the rising start point Pd appearing in the variation waveform Wd can be extracted with high accuracy, and consequently, the valve opening completion timing Top can be estimated with high accuracy.

Here, a negative terminal of the electromagnetic coil 13 at the time of the valve closing operation immediately after the energization is turned off is in a state in which an electrical connection with the ground is disconnected, and an electrical circuit including the electromagnetic coil 13 is disconnected from the ground. For that reason, the current hardly changes immediately after the energization is turned off, and the voltage is more likely to change than the current. Therefore, a change occurring in the voltage waveform Wa with the valve closing appears more remarkably than a change occurring in the current waveform Wc. In view of the above point, in the present embodiment, the sampling unit 61 acquires the voltage value as a sample value, and the timing estimation unit 64 estimates the valve-closing completion timing Tcl with the use of the sample value. Specifically, in the case of the voltage detection mode, the valve-closing completion timing Tcl is estimated. For that reason, the estimation accuracy can be improved as compared with the case where the valve-closing completion timing Tcl is estimated with the use of the current waveform Wc in which the current is used as the sample value.

On the other hand, a negative terminal of the electromagnetic coil 13 at the time of the valve opening operation immediately after the energization is turned on is electrically connected to the ground, and the electric circuit including the electromagnetic coil 13 is electrically connected to the ground and a power supply. For that reason, the voltage is more likely to be stabilized by the voltage of the power supply immediately after the energization is turned on, and the coil current corresponding to the inductance of the electromagnetic coil 13 is more likely to be changed than the voltage. Therefore, the change occurring in the current waveform Wc with the valve opening appears more remarkably than the change occurring in the voltage waveform Wa. In view of the above point, in the present embodiment, the sampling unit 61 acquires the current value as a sample value, and the timing estimation unit 64 estimates the valve opening completion timing Top with the use of the sample value. Specifically, in the case of the current detection mode, the valve opening completion timing Top is estimated. For that reason, the estimation accuracy can be improved as compared with the case in which the valve opening completion timing Top is estimated with the use of the voltage waveform Wa having the voltage as the sample value.

Further, in the present embodiment, the variation calculation unit 63 calculates the degree of variation based on the deviation between the average value of the multiple sample values D0 to D7 acquired in the sampling period Ls and each of the sample values D0 to D7. According to the above configuration, since the degree of variation is calculated with the use of the average value, the degree of variation can be calculated with high accuracy as compared with the case in which the degree of variation is calculated without using the average value, such that, for example, a representative value is selected from the sample values D0 to D7 and the degree of variation is calculated based on the deviation from the representative value. In particular, the robustness against noise can be improved with the use of the average value.

Second Embodiment

Figure 10:
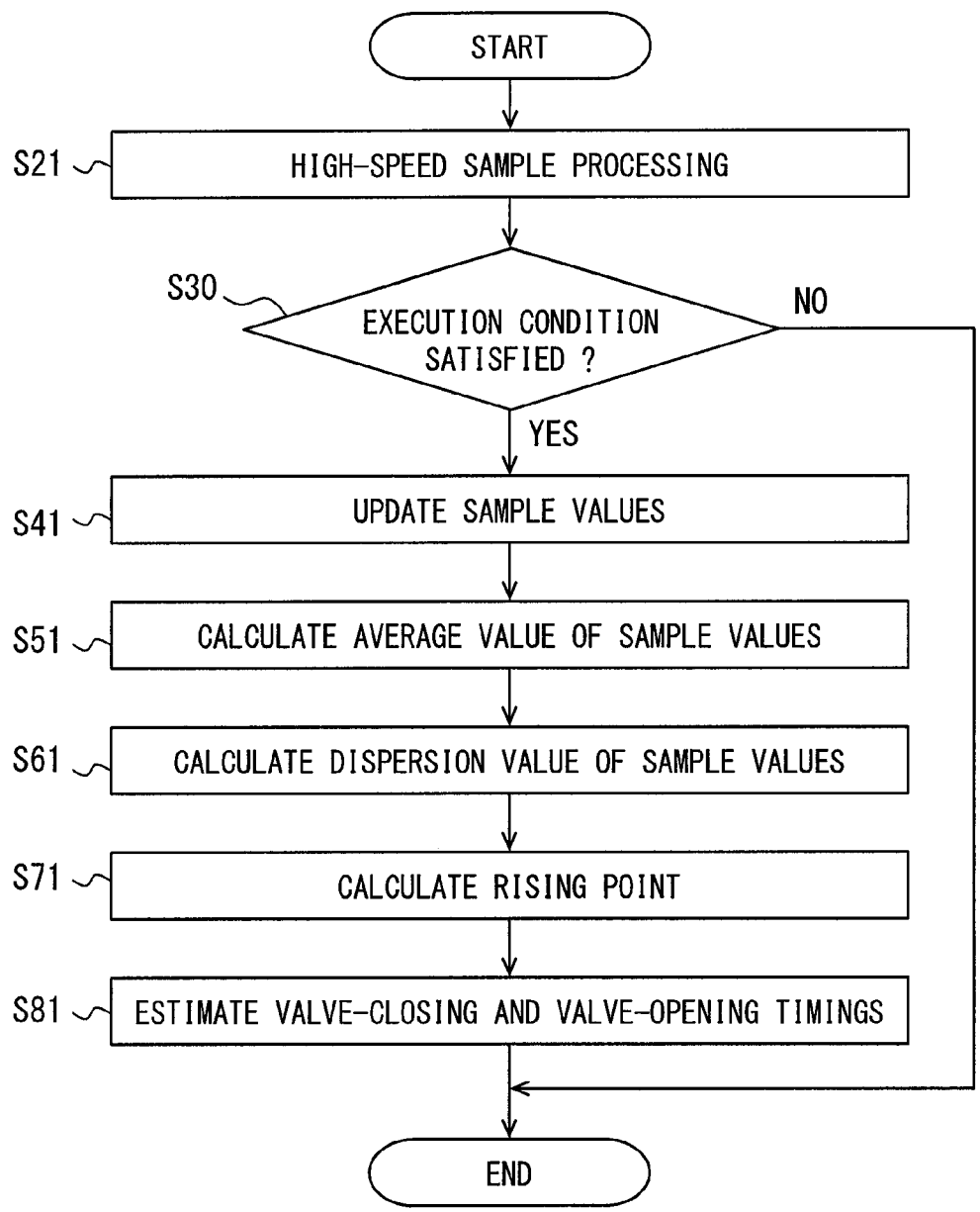
FIG. 10 is a flowchart showing a procedure of a process of estimating a valve closing timing and a valve opening timing by a valve body operation estimation device according to a second embodiment of the present disclosure.

In the first embodiment, in Step S10 of FIG. 7, the detection switch is switched between the voltage detection mode and the current detection mode. On the other hand, in the present embodiment, the voltage detection mode and the current detection mode are executed in parallel at the same time. Specifically, as shown in FIG. 10, first, in Step S21, both of the voltage waveform Wa and the current waveform Wc are acquired. The drive IC21 at the time of executing the process of Step S21 corresponds to the sampling unit 61, and the voltage waveform Wa and the current waveform Wc are acquired by acquiring both of the voltage value and the current value by high-speed processing, for example, at intervals of 1 μsec.

In short, the drive IC 21 shown in FIG. 1 has one AD converter for converting an analog signal output from the voltage detection unit 23 and the current detection unit 24 into a digital signal. On the other hand, the drive IC according to the present embodiment has an AD converter for each of the voltage detection unit 23 and the current detection unit 24.

In the following Step S30, it is determined whether or not the execution condition of the timing estimation is satisfied in the same manner as in FIG. 7. In the following Step S41, both the multiple voltage values configuring the voltage waveform Wa and the multiple current values configuring the current waveform Wc, which are acquired in Step S21, are stored in a memory of the drive IC 21. This memory corresponds to the sample value holding unit 62 shown in FIG. 1.

In the following Step S51, an average value of the multiple sample values in the sampling period Ls is calculated. Specifically, a voltage value included in the sampling period Ls corresponding to an arbitrary reference timing Tx is extracted from the multiple voltage values stored in the memory, and an average value of the extracted multiple voltage values is calculated. In the same manner, a current value included in the sampling period Ls corresponding to the arbitrary reference timing Tx is extracted from the multiple current values stored in the memory, and an average value of the extracted multiple current values is calculated. Then, the sampling period Ls is shifted by shifting the reference timing Tx by a predetermined time L, and the average of the voltage value and the average of the current value corresponding to each sampling period Ls are calculated.

In the following Step S61, the dispersion values of the multiple sample values extracted for each sampling period Ls are calculated with the use of the average values of the voltage values and the current values calculated in Step S51. The dispersion value is calculated for each sampling period Ls. The drive IC 21 when the processes of Steps S51 and S61 are executed corresponds to the variation calculation unit 63, and the dispersion values of the voltage values and current values calculated in Step S61 correspond to the degree of variation.

In the following Step S71, in the variation waveforms Wb and Wd representing the relationship between the reference timing Tx and the dispersion value, the rising points Pb2 and Pd2 at which the dispersion value rises from less than the thresholds TH1 and TH2 to the thresholds TH1 and TH2 or more are calculated. In the following Step S81, the valve-closing completion timing Tcl is estimated based on the rising point Pb2 calculated in Step S71, and the valve-opening completion timing Top is estimated based on the rising point Pd2 calculated in Step S71.

As described above, according to the present embodiment, the voltage waveform Wa and the current waveform Wc can be simultaneously acquired, and the valve-closing completion timing Tcl and the valve-opening completion timing Top can be simultaneously estimated, thereby being capable of improving the estimation frequency. Further, since the valve opening and closing timing for one injection can be estimated, the valve-closing completion timing Tcl and the valve-opening completion timing Top can be estimated for the same injection. Therefore, the aforementioned map indicating the relationship between the energization time Ti and the injection amount can be corrected with high accuracy.

Third Embodiment

Figure 11:
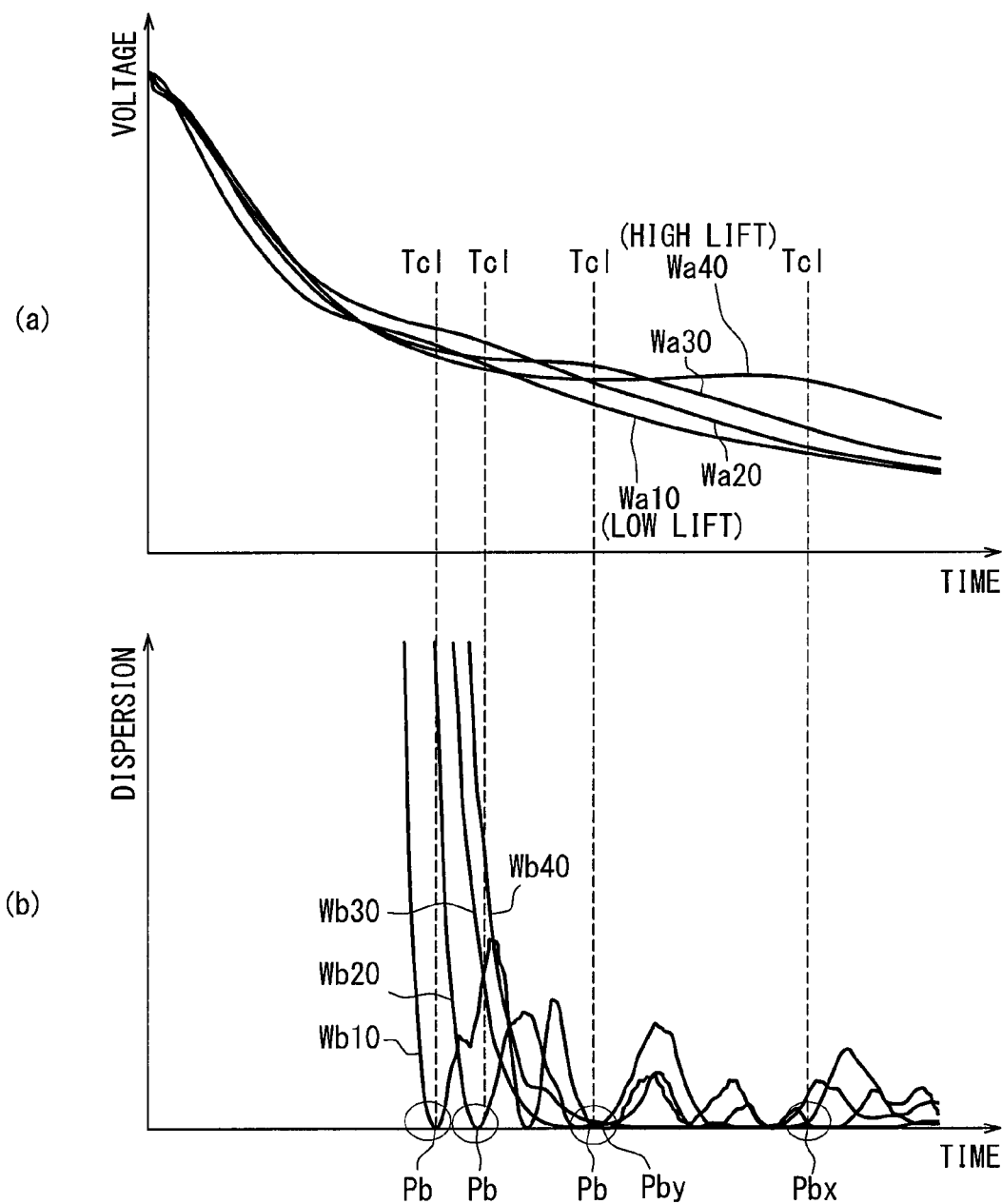
FIG. 11 illustrates diagrams showing a voltage waveform and a variation waveform according to the valve body operation estimation device according to a third embodiment of the present disclosure.

In the present embodiment, the variation waveforms Wb10 to Wb40 (refer to FIG. 5) according to the first embodiment are corrected so that the dispersion value of the rising start point Pb becomes zero (refer to FIG. 11). Then, a valve-closing completion timing Tcl and a valve-opening completion timing Top are estimated with the use of the corrected variation waveforms Wb10 to Wb40.

According to the above configuration, since the rising start point Pb and the lower stop point Pby appear more remarkably in the corrected variation waveforms Wb10 to Wb40, the estimation accuracy of the valve-closing completion timing Tcl and the valve-opening completion timing Top can be improved.

Fourth Embodiment

The timing estimation unit 64 according to the first embodiment estimates the valve-closing start timing Tcla based on the reference timing Tx of the rising start point Pb of the variation waveform Wb generated from the voltage waveform Wa. On the other hand, when a variation waveform Wb40 (refer to FIG. 5) at the time of high lift is acquired, a timing estimation unit 64 according to the present embodiment estimates a valve-closing completion timing Tcl based on the reference timing Tx of a lower stop point Pby of a variation waveform Wb. For example, a timing obtained by subtracting a predetermined time set in advance from the reference timing Tx or a timing obtained by multiplying the reference timing Tx by a coefficient set in advance is calculated as the valve-closing completion timing Tcl.

Fifth Embodiment

The timing estimation unit 64 according to the first embodiment estimates the valve-closing completion timing Tcl based on the variation waveform Wb generated from the voltage waveform Wa. On the other hand, a timing estimation unit 64 according to the present embodiment estimates a valve-closing start timing Tcla (refer to FIGS. 3 and 5) based on the variation waveform Wb described above. The valve-closing start timing Tcla is a timing at which the valve body 12 starts a valve closing operation in accordance with a start of de-energization of the electromagnetic coil 13.

More specifically, the timing estimation unit 64 calculates a timing obtained by subtracting a predetermined time set in advance from a reference timing Tx at a rising point Pb2 of a variation waveform Wb as the valve-closing start timing Tcla. Alternatively, the timing estimation unit 64 calculates a timing obtained by multiplying the reference timing Tx at the rising point Pb2 by a coefficient set in advance as the valve-closing start timing Tcla.

Figure 5:
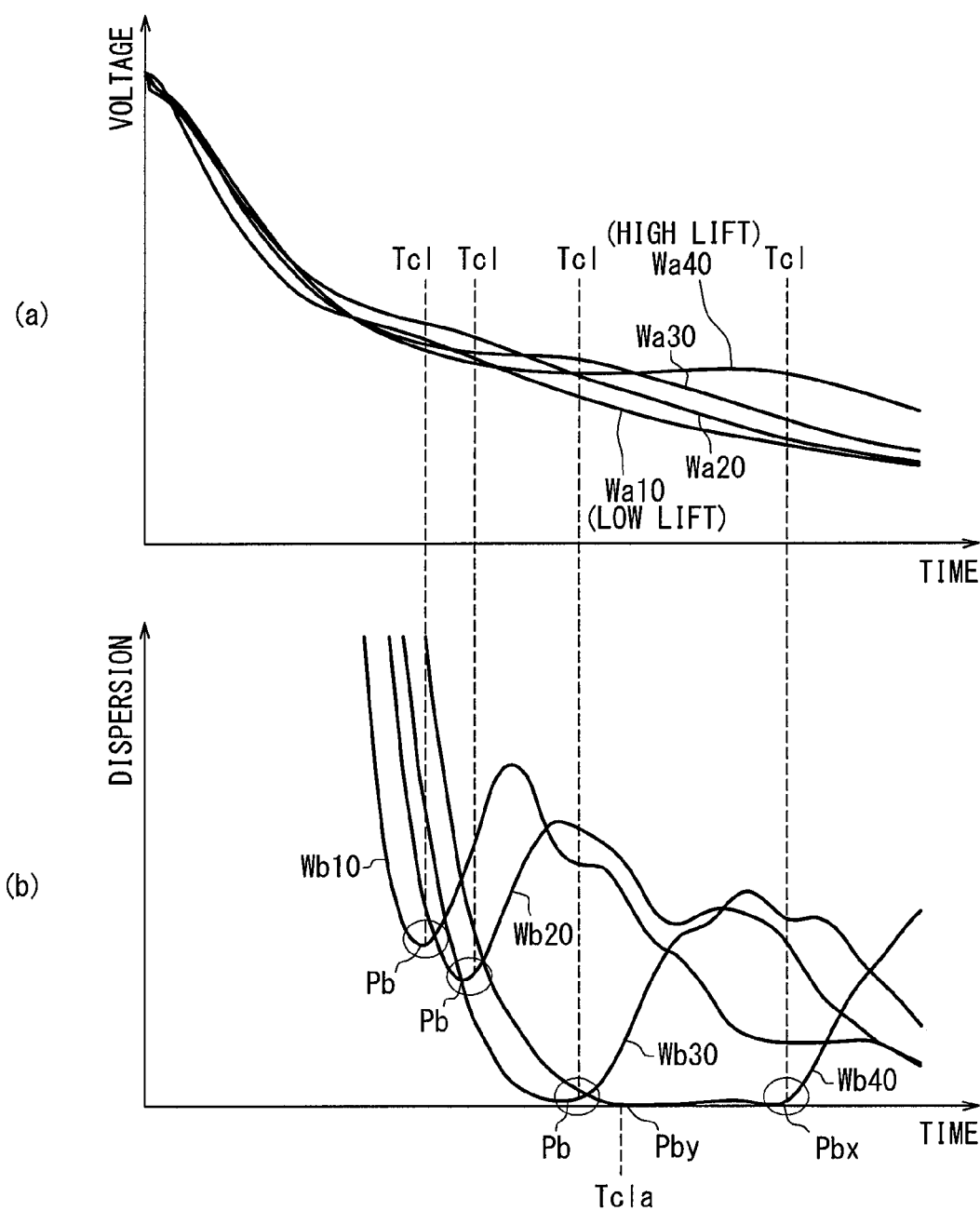
FIG. 5 illustrates diagrams showing a difference between the voltage waveform and a variation waveform according to the lift amount of a valve body shown in FIG. 2.

The timing estimation unit 64 estimates the valve-closing start timing Tcla on the basis of the reference timing Tx of the rising start point Pb as described above in the cases of variation waveforms Wb10, Wb20, and Wb30 at the time of low lift shown in FIG. 5(*b*). On the other hand, in the case of a variation waveform Wb40 at the time of high lift, the timing estimation unit 64 estimates the valve-closing start timing Tcla on the basis of the reference timing Tx of a lower stop point Pby. For example, the timing estimation unit 64 calculates a timing obtained by subtracting a predetermined time set in advance from the reference timing Tx, or obtained by multiplying the reference timing Tx by a coefficient set in advance is calculated as the valve-closing start timing Tcla.

Sixth Embodiment

The timing estimation unit 64 according to the first embodiment estimates the valve opening completion timing Top based on the variation waveform Wd generated from the current waveform Wc. On the other hand, a timing estimation unit 64 according to the present embodiment estimates a valve opening start timing Topa (refer to FIG. 6) based on the variation waveforms Wd. The valve opening start timing Topa is a timing at which a valve body 12 starts a valve opening operation in response to a start of the energization of an electromagnetic coil 13.

Specifically, in the same manner as in the fourth embodiment, the timing estimation unit 64 calculates a timing obtained by subtracting a predetermined time set in advance from the reference timing Tx at a rising point of a variation waveform Wd as the valve opening start timing Topa. Alternatively, the timing estimation unit 64 calculates a timing obtained by multiplying the reference timing Tx at the rising point of the variation waveform Wd by a coefficient set in advance as the valve opening start timing Topa.

In addition, the timing estimation unit 64 estimates the valve opening start timing Topa based on the reference timing Tx of the rising start point as described above in the case of the variation waveform Wd at the time of low lift. On the other hand, in the case of the variation waveform Wd at the time of high lift, the timing estimation unit 64 estimates the valve opening start timing Topa based on the reference timing Tx of the lower stop point of the variation waveform Wd. For example, the timing estimation unit 64 calculates a timing obtained by subtracting a predetermined time set in advance from the reference timing Tx or by multiplying the reference timing Tx by a coefficient set in advance as the valve opening start timing Topa.

Seventh Embodiment

In the first embodiment described above, in Step S70 of FIG. 7, the rising points Pb2 and Pd2 at which the dispersion values of the variation waveforms Wb and Wd rise from less than the thresholds TH1 and TH2 to the thresholds TH1 and TH2 or more are calculated (refer to FIGS. 3 and 6). Then, the valve-closing completion timing Tcl and the valve-opening completion timing Top are estimated based on the calculated rising points Pb2 and Pd2. On the other hand, in the present embodiment, slopes of variation waveforms Wb and Wd are calculated, and a valve-closing completion timing Tcl and a valve-opening completion timing Top are estimated based on a reference timing Tx at the point at which the values of the slopes rise and reach a predetermined threshold value.

FIGS. 12(*a*), 12(*b*), and 12(*c*) illustrating the present embodiment are the same as FIGS. 3(*a*), 3(*b*), and 3(*c*), and FIG. 12(*d*) shows a differential waveform ΔWb obtained by differentiating a variation waveform Wb shown in FIG. 12(*c*). In the differential waveform ΔWb shown in FIG. 12(*d*), a negative value is deleted.

A timing estimation unit 64 according to the present embodiment differentiates the acquired variation waveform Wb to calculate a differential waveform ΔWb. The timing estimation unit 64 calculates, as a slope increase point Pc, a point at which when a reference timing Tx is slowed down, a differential value of the deviation rises and then reaches a predetermined threshold TH3, after an energization completion time Toff in the differential waveform ΔWb. Then, the timing estimation unit 64 estimates a valve-closing completion timing Tcl based on the calculated slope increase point Pc.

The slope increase point Pc appears at a timing slightly delayed from the rising start point Pb, and is correlated with the rising start point Pb. In other words, the reference timing Tx at the slope increase point Pc correlates with the valve-closing completion timing Tcl. In view of the above fact, the timing estimation unit 64 detects the slope increase point Pc from the differential waveform ΔWb, and estimates the valve-closing completion timing Tcl based on the reference timing Tx at the slope increase point Pc. For example, the timing estimation unit 64 calculates a timing obtained by subtracting a predetermined time set in advance from the reference timing Tx at the slope increase point Pc as the valve-closing completion timing Tcl. Alternatively, the timing estimation unit 64 calculates a timing obtained by multiplying the reference timing Tx at the slope increase point Pc by a coefficient set in advance as the valve-closing completion timing Tcl.

As the differential waveform ΔWb used for calculating the slope increase point Pc, the timing estimation unit 64 may use a waveform obtained by differentiating the variation waveform Wb as it is, or may use a waveform obtained by subjecting a waveform obtained by differentiating the variation waveform Wb to a smoothing process.

In the above description, the timing estimation unit 64 calculates the differential waveform ΔWb of the variation waveform Wb calculated from the voltage waveform Wa, and estimates the valve-closing completion timing Tcl with the use of the differential waveform ΔWb. The timing estimation unit 64 also performs the estimation of the valve-opening completion timing Top in the same manner. In other words, the timing estimation unit 64 calculates the differential waveform by differentiating the value of the variation waveform Wd calculated from the current waveform Wc shown in FIG. 6, calculates the slope increase point which rises to a predetermined threshold value in the differential waveform, and estimates the valve opening completion timing Top based on a reference timing at the calculated slope increase point.

In short, in the present embodiment, in estimating the valve-closing completion timing Tcl and the valve-opening completion timing Top based on the reference timing Tx at the rising start points Pb and Pd of the variation waveforms Wb and Wd, the timing estimation unit 64 performs the estimation from the slopes (differential waveforms) of the variation waveforms Wb and Wd.

Although the preferred embodiments of the present disclosure have been described above, the present disclosure is not limited to the embodiments described above, and can be implemented by various modifications as exemplified below. Not only combinations of portions clearly indicating that specific combinations can be performed in the respective embodiments, but the partial combinations of the embodiments even if the combinations are not clearly indicated, unless there is a problem in the combinations in particular. Modifications to the above embodiments will be described below.

The variation calculation unit 63 according to the first embodiment uses dispersion as the degree of variation of the multiple sample values D0 to D7, but the degree of dispersion is not limited to the dispersion. For example, the deviation between the average value and each of the sample values D0 to D7 may be calculated, an absolute value of each deviation may be added, the added value may be divided by a predetermined value, and a value obtained by squaring the divided value may be calculated as the degree of variation.

In the example shown in FIG. 7, the valve closing timing is estimated in the voltage detection mode, but the valve opening timing may be estimated in the voltage detection mode. Specifically, the valve opening timing may be estimated based on the variation waveform Wb generated from the voltage waveform Wa. In the example shown in FIG. 7, the valve opening timing is estimated in the current detection mode, but the valve closing timing may be estimated in the current detection mode. Specifically, the valve closing timing may be estimated based on the variation waveform Wd generated from the current waveform Wc.

In the seventh embodiment described above, the valve-closing completion timing Tcl and the valve-opening completion timing Top are estimated from the slopes (differential waveforms) of the variation waveforms Wb and Wd. On the other hand, in the same manner, the valve-closing start timing Tcla and the valve-opening start timing Topa may be estimated from the slopes (differential waveforms) of the variation waveforms Wb and Wd.

In Step S10 of FIG. 7, the detection mode is switched so that the frequency of executing the voltage detection mode is higher than the frequency of executing the current detection mode. On the other hand, switching may be performed so as to have the same frequency. For example, the detection mode may be switched every time the fuel injection by the fuel injection valve 10 is performed once, or may be switched every time the fuel injection is performed a predetermined number of times. The detection mode may be switched according to the operation state of the internal combustion engine E, may be switched according to the length of the energization time Ti, or may be switched according to the pressure of the fuel to be supplied to the fuel injection valve 10.

In the first embodiment, after the coil current is increased to the first target value I1 in the current rising period by the boost voltage, the coil current is held at the second target value I2 in the current holding period by the battery voltage. On the other hand, in the current holding period, the second boost voltage may be applied and held at the second target value I2. In that case, the boost voltage in the current rising period may be set as the first boost voltage, and the second boost voltage may be set to a value smaller than the first boost voltage, or the second boost voltage may be set to the same value as that of the first boost voltage.

In the first embodiment, the coil current is held at the second target value I2 while the on state is continuously controlled without turning off the voltage application in the current holding period. On the other hand, in the current holding period, the coil current may be held at the second target value I2 by controlling the duty of the voltage application. However, when the valve opening completion timing or the valve opening start timing is estimated with the use of the current value as a sampling value, it is desirable to abolish the duty control and to continuously turn on the voltage application in the current holding period. In the fuel injection valve 10 shown in FIG. 2, the valve body 12 and the movable core 15 are separated in configuration from each other, but the valve body 12 and the movable core 15 may be integrally configured. As an integral, when the movable core 15 is attracted, the valve body 12 is also displaced in the valve opening direction along with the movable core 15 to open the valve. The fuel injection valve 10 shown in FIG. 2 is configured to start the movement of the valve body 12 simultaneously with the start of the movement of the movable core 15, but the present disclosure is not limited to such a configuration. For example, the valve body 12 may not start to open even when the movable core 15 starts to move, and the movable core 15 may engage with the valve body 12 to start to open when the movable core 15 moves by a predetermined amount.

The voltage detection unit 23 shown in FIG. 1 may detect the negative terminal voltage of the electromagnetic coil 13, may detect the positive terminal voltage, or may detect an inter-terminal voltage between the positive terminal and the negative terminal.

The means and/or functions provided by the ECU 20 may be provided by software recorded on a tangible storage medium and a computer executing the software, hardware alone, or a combination of those components. For example, if the control device is provided by an electronic circuit that is hardware, the control device may be provided by a digital circuit or an analog circuit that includes a large number of logic circuits.

A valve body operation estimation device illustrated in the above embodiments is applied to a fuel injection valve including a body having an injection hole through which fuel injected, a valve body that is separated from or seated on a seating surface of the body to open or close the injection hole, and an electromagnetic coil that generates electromagnetic attraction force as valve opening force of the valve body.

The valve body operation estimation device is configured to estimate at least one of a valve-closing start timing that the valve body starts valve closing operation upon start of de-energization of the electromagnetic coil, a valve-closing completion timing that the valve closing operation is completed, a valve-opening start timing that the valve body starts valve opening operation upon start of energization of the electromagnetic coil, and a valve-opening completion timing that the valve opening operation is completed.

The valve body operation estimation device includes a sampling unit that is configured to obtain at least one of voltage and current of the electromagnetic coil as a plurality of sample values at intervals of a predetermined time in a sampling period set based on a predetermined reference timing, a variation calculation unit that is configured to calculate a degree of variation of the plurality of sample values obtained in the sampling period, a variation waveform which represents a change of the degree of variation caused by shifting the reference timing including a point at which the degree of variation reduces and then rises as the reference timing is delayed, the point referred to as a rising start point, and a timing estimation unit that is configured to estimate at least one of the valve-closing start timing, the valve-closing completion timing, the valve-opening start timing, and the valve-opening completion timing based on the reference timing at the rising start point.

According to the above embodiments, the degree of variation is calculated for at least one of the voltage value and the current value in the sampling period. Then, at least one of the valve-closing start timing, the valve-closing completion timing, the valve-opening start timing, and the valve-opening completion timing is estimated based on the reference timing at the rising start point of the variation waveform representing the relationship between the reference timing and the degree of variation. The inventor has found that there is a correlation between those timings and the reference timing at the rising start point of the variation waveform, and the rising start point having such a correlation appears remarkably in the variation waveform. The conspicuousness, that is, the easiness of extraction of the rising start point with respect to the variation waveform is higher than the conspicuousness of the fine movement waveform with respect to the conventional voltage waveform. Therefore, according to the above embodiments, the rising start point appearing in the variation waveform can be extracted with high accuracy, and consequently, the operation timing of the valve body can be estimated with high accuracy. Moreover, since the reference waveforms can be eliminated, the estimation of the operation timings can be realized while eliminating the necessity of the operation of adapting the smoothing coefficients.

A valve body operation estimation device also illustrated in the above embodiments is applied to a fuel injection valve including a body having an injection hole through which fuel injected, a valve body that is separated from or seated on a seating surface of the body to open or close the injection hole, and an electromagnetic coil that generates electromagnetic attraction force as valve opening force of the valve body.

The valve body operation estimation device is configured to estimate at least one of a valve-closing start timing that the valve body starts valve closing operation upon start of de-energization of the electromagnetic coil, a valve-closing completion timing that the valve closing operation is completed, a valve-opening start timing that the valve body starts valve opening operation upon start of energization of the electromagnetic coil, and a valve-opening completion timing that the valve opening operation is completed.

The valve body operation estimation device includes a sampling unit that is configured to obtain at least one of voltage and current of the electromagnetic coil as a plurality of sample values at intervals of a predetermined time in a sampling period set based on a predetermined reference timing, a variation calculation unit that is configured to calculate a degree of variation of the plurality of sample values obtained in the sampling period, a variation waveform which represents a change of the degree of variation caused by shifting the reference timing including a point at which the degree of variation reduces and stops this reduction as the reference timing is delayed, the point referred to as a lower stop point, and a timing estimation unit that is configured to estimate at least one of the valve-closing start timing, the valve-closing completion timing, the valve-opening start timing, and the valve-opening completion timing based on the reference timing at the lower stop point.

According to the above embodiments, the degree of variation is calculated for at least one of the voltage value and the current value in the sampling period. Then, at least one of the valve-closing start timing, the valve-closing completion timing, the valve-opening start timing, and the valve-opening completion timing is estimated based on the reference timing at a lower stop point of the variation waveform representing the relationship between the reference timing and the degree of variation. The inventor has found that there is a correlation between those timings and the reference timing at the lower stop point of the variation waveform, and the lower stop point having such a correlation appears remarkably in the variation waveform. The conspicuousness, that is, the easiness of extraction of the lower stop point with respect to the variation waveform is higher than the conspicuousness of the fine movement waveform with respect to the conventional voltage waveform. Therefore, according to the above embodiments, the lower stop point appearing in the variation waveform can be extracted with high precision, and consequently, the operation timing of the valve body can be estimated with high accuracy. Moreover, since the reference waveforms can be eliminated, the estimation of the operation timings can be realized while eliminating the necessity of the operation of adapting the smoothing coefficients.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A valve body operation estimation device applied to a fuel injection valve including:
   a body having an injection hole through which fuel is injected;
   a valve body that is separated from or seated on a seating surface of the body to open or close the injection hole; and
   an electromagnetic coil that generates electromagnetic attraction force as valve opening force of the valve body,
   the valve body operation estimation device configured to estimate:
   a valve-closing start timing that the valve body starts valve closing operation upon start of de-energization of the electromagnetic coil; or
   a valve-closing completion timing that the valve closing operation is completed;
   the valve body operation estimation device comprising:

drive integrated circuitry configured to at least perform as:
- a sampler to obtain voltage of the electromagnetic coil as sample values at intervals of a predetermined time in a sampling period set based on a predetermined reference timing;
- a variation calculator to calculate a degree of variation of the plurality of sample values obtained in the sampling period, wherein a variation waveform representing a change of the degree of variation caused by shifting the reference timing includes a point at which the degree of variation reduces and then rises as the reference timing is delayed, the point referred to as a rising start point; and
- a timing estimator to estimate a timing obtained by subtracting a predetermined time from the reference timing at the rising start point, a timing obtained by multiplying the reference timing at the rising start point by a preset coefficient, or the reference timing at the rising start point as the valve-closing start timing or the valve-closing completion timing.

2. The valve body operation estimation device according to claim 1, wherein the variation calculator calculates the degree of variation based on a deviation between an average value of the plurality of sample values obtained in the sampling period and each of the plurality of sample values.

3. A valve body operation estimation device applied to a fuel injection valve including:
- a body having an injection hole through which fuel is injected;
- a valve body that is separated from or seated on a seating surface of the body to open or close the injection hole; and
- an electromagnetic coil that generates electromagnetic attraction force as valve opening force of the valve body, the valve body operation estimation device configured to estimate:
- a valve-opening start timing that the valve body starts valve opening operation upon start of energization of the electromagnetic coil; or
- a valve-opening completion timing that the valve opening operation is completed, drive integrated circuitry configured to at least perform as:
- a sampler to obtain current of the electromagnetic coil as sample values at intervals of a predetermined time in a sampling period set based on a predetermined reference timing;
- a variation calculator to calculate a degree of variation of the plurality of sample values obtained in the sampling period, wherein a variation waveform representing a change of the degree of variation caused by shifting the reference timing includes a point at which the degree of variation reduces and then rises as the reference timing is delayed, the point referred to as a rising start point; and
- a timing estimator to estimate a timing obtained by subtracting a predetermined time from the reference timing at the rising start point, a timing obtained by multiplying the reference timing at the rising start point by a preset coefficient, or the reference timing at the rising start point as the valve-opening start timing or the valve-opening completion timing.

4. The valve body operation estimation device according to claim 3, wherein the variation calculator calculates the degree of variation based on a deviation between an average value of the plurality of sample values obtained in the sampling period and each of the plurality of sample values.

* * * * *